US011998035B2

(12) United States Patent
Tanaka

(10) Patent No.: US 11,998,035 B2
(45) Date of Patent: Jun. 4, 2024

(54) MOISTURE CONTROL APPARATUS AND MOISTURE CONTROL METHOD

(71) Applicant: EVERTRON HOLDINGS PTE LTD, The Adelphi (SG)

(72) Inventor: Hisao Tanaka, Tokyo (JP)

(73) Assignee: EVERTRON HOLDINGS PTE LTD, Singapore (SG)

( * ) Notice: Subject to any disclaimer, the term of this patent is extended or adjusted under 35 U.S.C. 154(b) by 435 days.

(21) Appl. No.: 15/893,060

(22) Filed: Feb. 9, 2018

(65) Prior Publication Data

US 2019/0200648 A1 Jul. 4, 2019

(30) Foreign Application Priority Data

Dec. 31, 2017 (JP) .................................. 2017-255302

(51) Int. Cl.
| | |
|---|---|
| *A23L 3/30* | (2006.01) |
| *A23L 3/00* | (2006.01) |
| *A23L 3/26* | (2006.01) |
| *A47J 37/12* | (2006.01) |
| *B01J 19/08* | (2006.01) |
| *B01J 19/10* | (2006.01) |

(52) U.S. Cl.
CPC ................. *A23L 3/30* (2013.01); *A23L 3/001* (2013.01); *A23L 3/26* (2013.01); *A47J 37/1266* (2013.01); *A47J 37/1271* (2013.01); *B01J 19/087* (2013.01); *B01J 19/10* (2013.01); *A23V 2002/00* (2013.01); *B01J 2219/00695* (2013.01)

(58) Field of Classification Search
CPC .... A23L 3/30; A23L 3/26; A23L 3/001; A47J 37/1266; A47J 37/1271; B01J 19/087; B01J 19/10; B01J 2219/00695; A23V 2002/00; F26B 5/00; F26B 25/06
USPC ....... 204/157.42, 157.62; 422/128, 186–187, 422/20
See application file for complete search history.

(56) References Cited

U.S. PATENT DOCUMENTS 3,540,994 A * 11/1970 Napier ................... C10G 33/02
204/280
4,333,521 A 6/1982 Stottman et al.
(Continued)

FOREIGN PATENT DOCUMENTS

| CN | 102264883 A | 11/2011 |
|---|---|---|
| CN | 204698314 U | * 10/2015 |

(Continued)

OTHER PUBLICATIONS

Machine translation of JP 2016-129672 description (Year: 2016).*
(Continued)

*Primary Examiner* — Harry D Wilkins, III
(74) *Attorney, Agent, or Firm* — HAUPTMAN HAM, LLP

(57) ABSTRACT

A moisture control apparatus includes at least one electrode configured to receive at least one of an alternating current or a direct current, and to direct at least one of an electric field, a magnetic field, an electromagnetic field, an electromagnetic wave, a sonic wave, or a supersonic wave toward a substance. The moisture control apparatus further includes a controller configured to communicate with the at least one electrode, wherein the controller is configured to control a voltage applied to the at least one electrode to induce a bonded state between water molecules of moisture present in the substance.

34 Claims, 12 Drawing Sheets

(56) References Cited

U.S. PATENT DOCUMENTS

| | | | | |
|---|---|---|---|---|
| 4,731,227 A | * | 3/1988 | Pulvari | B01J 3/08 |
| | | | | 310/369 |
| 6,193,878 B1 | * | 2/2001 | Morse | B01J 19/0006 |
| | | | | 204/661 |
| 6,451,364 B1 | * | 9/2002 | Ito | A23L 3/26 |
| | | | | 426/244 |
| 6,482,327 B1 | * | 11/2002 | Mori | C02F 9/00 |
| | | | | 210/695 |
| 6,638,475 B1 | * | 10/2003 | Lagunas-Solar | A23L 3/01 |
| | | | | 204/164 |
| 6,881,314 B1 | * | 4/2005 | Wang | B01D 21/283 |
| | | | | 204/450 |
| 7,654,196 B2 | | 2/2010 | Uchikawa et al. | |
| 10,757,960 B2 | | 9/2020 | Tanaka | |
| 2002/0047009 A1 | | 4/2002 | Flugstad et al. | |
| 2003/0205571 A1 | | 11/2003 | Flugstad et al. | |
| 2006/0112699 A1 | | 6/2006 | Sato et al. | |
| 2006/0130674 A1 | | 6/2006 | Uchikawa et al. | |
| 2007/0254080 A1 | * | 11/2007 | Schackmuth | G07F 17/0078 |
| | | | | 426/523 |
| 2009/0199570 A1 | | 8/2009 | Fujisaki et al. | |
| 2009/0243635 A1 | * | 10/2009 | Bhattacharjee | G01N 33/2847 |
| | | | | 324/698 |
| 2009/0252842 A1 | | 10/2009 | Wang et al. | |
| 2010/0215961 A1 | * | 8/2010 | Aubry | B03C 5/005 |
| | | | | 428/403 |
| 2011/0248189 A1 | | 10/2011 | Fukamachi et al. | |
| 2014/0064712 A1 | * | 3/2014 | Grega | C02F 1/48 |
| | | | | 392/311 |
| 2014/0287150 A1 | | 9/2014 | Miljkovic et al. | |
| 2015/0237683 A1 | | 8/2015 | Polato et al. | |
| 2015/0291456 A1 | * | 10/2015 | Findikoglu | B01D 17/06 |
| | | | | 210/748.01 |
| 2016/0015076 A1 | | 1/2016 | Goto et al. | |
| 2016/0350715 A1 | | 12/2016 | Minvielle | |
| 2017/0055774 A1 | | 3/2017 | Grimaldi et al. | |
| 2017/0181455 A1 | * | 6/2017 | Bullo | H05B 6/62 |
| 2019/0038077 A1 | | 2/2019 | Tanaka | |
| 2019/0038998 A1 | * | 2/2019 | Leitner | B03C 11/00 |
| 2019/0364933 A1 | * | 12/2019 | Jung | A23L 3/32 |

FOREIGN PATENT DOCUMENTS

| | | | | |
|---|---|---|---|---|
| DK | 174056 B1 | | 5/2002 | |
| EA | 009630 B1 | | 2/2008 | |
| GB | 2506905 A | | 4/2014 | |
| JP | S48-23044 A | | 3/1973 | |
| JP | S51-037271 B | | 10/1976 | |
| JP | H1-160472 A | | 6/1989 | |
| JP | H3-258218 A | | 11/1991 | |
| JP | H4-260751 A | | 9/1992 | |
| JP | H6-230325 A | | 8/1994 | |
| JP | H7-155154 A | | 6/1995 | |
| JP | 11-113761 A | | 4/1999 | |
| JP | 2001-86967 A | | 4/2001 | |
| JP | 2002-136430 A | | 5/2002 | |
| JP | 2002-204754 A | | 7/2002 | |
| JP | 2003-142248 A | | 5/2003 | |
| JP | 2003-343961 A | | 12/2003 | |
| JP | 2004-41531 A | | 2/2004 | |
| JP | 2004513641 A | * | 5/2004 | A23L 3/01 |
| JP | 2006-102447 A | | 4/2006 | |
| JP | 2006-109816 A | | 4/2006 | |
| JP | 2007-82678 A | | 4/2007 | |
| JP | 2012-223119 A | | 11/2012 | |
| JP | 2015-27443 A | | 2/2015 | |
| JP | 5727104 B1 | | 6/2015 | |
| JP | 2016-112205 A | | 6/2016 | |
| JP | 2016-129672 A | * | 7/2016 | A23L 5/10 |
| JP | 2017-12684 A | | 1/2017 | |
| JP | 6095087 B1 | | 3/2017 | |
| KR | 10-2016-0032952 A | | 3/2016 | |
| KR | 10-2017-0086129 A | | 7/2017 | |
| KR | 10-2071529 B1 | | 1/2020 | |
| SU | 1324629 A1 | | 7/1987 | |
| TW | M416753 U | | 11/2011 | |
| WO | 2005/013730 A1 | | 2/2005 | |
| WO | 2006/054348 A1 | | 5/2006 | |
| WO | 2008/117341 A1 | | 10/2008 | |
| WO | 2010073572 A1 | | 7/2010 | |
| WO | 2012/144129 A1 | | 10/2012 | |
| WO | 2013/161508 A1 | | 10/2013 | |
| WO | 2014/208658 A1 | | 12/2014 | |
| WO | 2015/122070 A1 | | 8/2015 | |
| WO | 2017/183586 A1 | | 10/2017 | |
| WO | WO 2017/179752 A1 | * | 10/2017 | A23L 3/26 |
| WO | WO2019132046 A1 | | 1/2020 | |

OTHER PUBLICATIONS

"Supersonic flight," Britannica Academic, Encyclopædia Britannica, Jul. 21, 2015. academic.eb.com/levels/collegiate/article/supersonic-flight/70404. Accessed Dec. 4, 2020 (Year: 2015).*

Machine translation of CN 204698314 U (Year: 2015).*

Office Action in JP Application No. 2014-124173, dated Apr. 10, 2017, 7pp.

Satoshi Nishimura et al. "Electrocapillary Phenomena at Edible Oil/Saline Interfaces", Journal of Oleo Science, 2017, pp. 235-249, Japan, 15pp.

Office Action in CN application No. 201880058728.6, dated Jun. 6, 2022, 32pp.

Zhang Jian, "Oil field mine separation technology and equipment", China University of Petroleum Press, Jun. 2011, pp. 246-253, 25pp.

Examination Report in EP Application No. 18895338.4, dated Aug. 9, 2022. 6pp.

Michael Von Domaros et al., "Supporting information for: Dynamics at a Janus interface", The Journal of Physical Chemistry C, vol. 117, No. 9, Mar. 7, 2013, pp. 4561-4567, 10pp.

"Freshness is life! Amazing technology!", Oct. 24, 2017, Dawn of Gaia, URL:https://lovely-lovely-net.translate.goog/business/evertron/?_x_tr_sl=ja&_x_tr_tl=en&_x_tr_hl=en&_x_tr_pto=sc, Japan, 134pp.

Extended European search report in EP application No. 18895338.4, dated Aug. 26, 2021, 10pp.

https://evertron.jp/foodasset/?lang=ja, Mar. 2023, web, 16pp.

International Search Report in PCT/JP2018/048626, dated Apr. 2, 2019. 5pp.

Office Action in JP Application No. 2019-536612 dated Sep. 2, 2019, 16pp.

Liu Kenjian, "Vocational Education Excellence Planning Teaching Materials Fan Hang and Electronic Skills Practical Training", Beijing University of Technology Press, Nov. 2015, http://www.bitpress.com.cn, 12pp.

Office Action in CN application No. 201880058728.6, dated Aug. 24, 2021, 31pp.

Office Action in IN application No. 202017027205, dated Jul. 14, 2021, 8pp.

Office Action in JP application No. 2019-536612, dated Feb. 2, 2021, 12pp.

Office Action in JP application No. 2021-064495, dated Jul. 13, 2021, 10pp.

Office Action in SG application No. 11202004928P, dated Jan. 3, 2022, 7pp.

Trial and Appeal Decision in JP application No. 2019-536612, dated Jan. 25, 2022, 44pp.

Interview Summary in U.S. Appl. No. 16/053,739, dated Mar. 20, 2023, 11pp.

Office Action in KR application No. 10-2018-0016338, dated Mar. 28, 2023, 16pp.

Takeshi Misono, "Interfacial Tension Between Water and Oil", Measurement Techniques and Practices of Colloid and Interface Phenomena, Springer, pp. 39-44, https://doi.org/10.1007/978-981-13-5931-6_6, 2019, 145pp.

Advisory Action in U.S. Appl. No. 16/053,739, dated Oct. 11, 2023, 4pp.

(56) References Cited

OTHER PUBLICATIONS

Office Action in U.S. Appl. No. 16/958,744, dated Sep. 27, 2023, 75pp.

* cited by examiner

MOISTURE CONTROL APPARATUS AND MOISTURE CONTROL METHOD

RELATED APPLICATIONS

The present application claims priority to Japanese Application No. 2017-255302, filed Dec. 31, 2017, the disclosure of which is hereby incorporated by reference herein in its entirety.

TECHNICAL FIELD

This disclosure relates to a moisture control apparatus and a moisture control method.

BACKGROUND ART

A fryer is known that gives a truly excellent flavor to cooked food by cooking food in a space in which an electromagnetic wave having a given range of frequencies is generated (see Patent Document 1). Patent Document 1, including Specification, Scope of Claims, and Drawings, is incorporated herein in its entirety by reference. Patent Document 1 states that excellent effects such as the prevention of oxidization/deterioration of cooking oil and an improved flavor of cooked food can be obtained by cooking food in a space in which an electromagnetic wave having a given range of frequencies is generated.

RELATED ART

Patent Document

[Patent Document 1] Japanese Patent Application Laid-open No. 2016-129672

SUMMARY

With the fryer and cooking method described in Patent Document 1, however, the principle of flavor improvement is not examined with respect to all types of food, to other cooking methods, or to matters other than food.

The inventors of this disclosure have conducted numerous analyses from various viewpoints about how food is affected by an electromagnetic wave having a given range of frequencies. As a result, the inventors have found that control of moisture (including free water) contained in food impacts flavor of the food. A method of controlling the moisture also impacts items other than food, and the findings have led to the completion of a moisture control apparatus and moisture control method of this disclosure.

In other words, an object of at least one embodiment of this disclosure is to provide a moisture control apparatus and a moisture control method with which moisture contained in a substance can be controlled to improve characteristics of the substance.

The objects of at least one embodiment of this disclosure is achieved by a moisture control apparatus. The moisture control apparatus includes at least one electrode configured to generate at least one of an electric field, a magnetic field, an electromagnetic field, an electromagnetic wave, a sonic wave, or a supersonic wave. The moisture control apparatus is capable of improving properties of a substance placed so as to be opposed to the at least one electrode by creating a bonded state in which water molecules of moisture present in the substance are bonded to one another through application of a given voltage, which includes a direct current component and/or an alternating current component, to the at least one electrode. Objects of at least one embodiment of this disclosure are also achieved by a moisture control method. The moisture control method is capable of improving properties of a substance placed so as to be opposed to at least one electrode from which at least one of an electric field, a magnetic field, an electromagnetic field, an electromagnetic wave, a sonic wave, or a supersonic wave is generated. The moisture control method includes creating a bonded state in which water molecules of moisture present in the substance are bonded to one another through application of a given voltage, which includes a direct current component and/or an alternating current component, to the at least one electrode.

Other aspects of this description relate to a storage medium for storing instructions for executing the moisture control method, a product, an apparatus, or an equipment, including the moisture control apparatus.

Still other aspects of this description relate to a substance. The substance includes water molecules of moisture, wherein a bonded state in which the water molecules are bonded to one another is created by the moisture control apparatus.

Free water as moisture is water in a normal state in which free movement is allowed as opposed to bound water, which is in a bonded state at chemically varying degrees. In food, free water is water mechanically maintained between tissues, and is water exhibiting the properties of ordinary water (reference materials: "Encyclopedia Nipponica 2001", "Digital Daijisen", "Eiyo/Seikagaku Jiten" (translates as "Nutrition/Biochemistry Dictionary")).

Effects

According to at least one embodiment of this disclosure, the moisture control apparatus and the moisture control method can improve characteristics of the substance by controlling moisture contained in the substance.

DETAILED DESCRIPTION

A description is given below with reference to the drawings on a moisture control apparatus, moisture control method, program, storage medium, and generated substance according to embodiments of this disclosure. However, the following embodiments are exemplification of the moisture control apparatus, moisture control method, program, storage medium, and generated substance for embodying the technical concept of this disclosure, and are not to limit this disclosure thereto, which means that the technical concept of this disclosure is equally applicable to other embodiments included in the scope of claims. While the description of the embodiments takes as an example free water in the form of moisture contained in a substance, moisture contained in a substance in this disclosure is not limited to free water, and this disclosure is applicable to diverse forms of moisture, for example, an aqueous solution, water, and minute water drops contained in an emulsion.

A moisture control apparatus, a moisture control method, a program, a storage medium, a generated substance, a product, an apparatus, and an equipment according to at least one embodiment of this disclosure are described with reference to FIG. 1 to FIG. 9.

Figure 1:
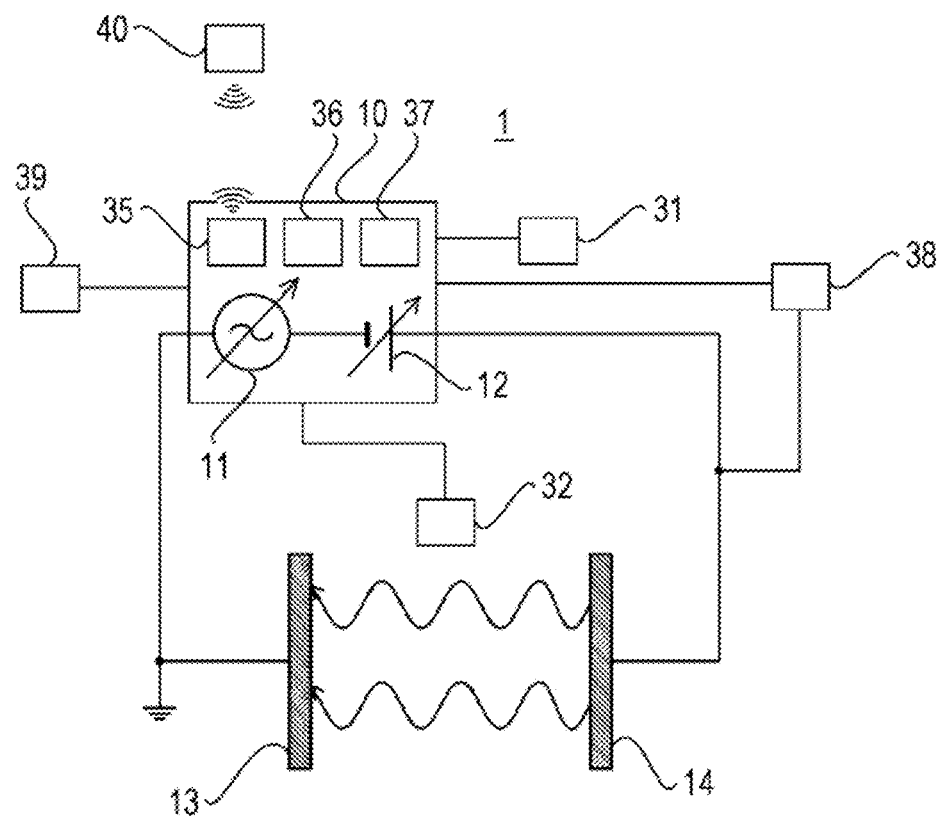
FIG. 1 A conceptual diagram of an electrode in at least one embodiment of this disclosure.

FIG. 1 is a conceptual diagram of a moisture control apparatus 1 in at least one embodiment of this disclosure. The moisture control apparatus 1 includes a controller 10 and a pair of electrodes 13 and 14. The controller 10 includes an alternating current component voltage generator 11 and a direct current component voltage generator 12. The alternating current component voltage generator 11 and the direct current component voltage generator 12 are not required to be provided separately in an actual circuit configuration of the controller 10, and a circuit configuration in which a single unit has the functions of the two can be employed.

The controller 10 is provided with a communicator 35, a CPU 36, and a storage 37. The communicator 35 holds communication to/from a server 40 to receive a control parameter and a control value from the server 40. The storage 37 stores a program. The CPU 36 uses the program stored in the storage 37 to control an output voltage and/or an output current by controlling the alternating current component voltage generator 11 and the direct current component voltage generator 12, which are built into the controller 10, based on a control parameter and a control value, which are received from the server. The program can be rewritten from the server 40 via the communicator 35. The program on the controller 10 may also be rewritten with the use of a removable memory by storing the program in a flash memory or a similar removable memory in advance.

A substance detection sensor 32 for detecting the type and/or state of a substance placed between the electrodes is connected to the controller 10. Through detection of the type and/or state of the substance, the controller 10 controls the built-in alternating current component voltage generator 11 and direct current component voltage generator 12 so that the output voltage and/or the output current is suitable for the type and/or state of the substance. The alternating current component voltage generator 11 and direct current component voltage generator 12 built into the controller 10 have at least one function out of direct current-direct current conversion, direct current-alternating current conversion, alternating current-direct current conversion, and alternating current-alternating current conversion as described later.

A man-machine interface 31 is connected to the controller 10 as well to enable an operator to operate the controller 10. Examples of the man-machine interface 31 include a display, a touch panel, a keyboard, and a mouse. When the controller 10 is operated with the use of a smartphone, a tablet terminal, or a notebook computer or any other personal computer (hereinafter abbreviated as "PC"), the smartphone or the like can serve as the man-machine interface 31, the communicator 35, and other components.

The controller 10 is connected to an external power source 39. The external power source 39 can be an alternating current power source or a direct current power source and, in the case of a direct current power source, can be a battery, examples of which include a primary battery and a secondary battery. The use of a battery as the external power source 39 is a convenient way to secure a power source when the moisture control apparatus 1 is mobile, conveyable, or portable.

The controller 10 performs feedback control on at least one of the current value, voltage value, frequency, or phase of a voltage/current applied to the electrodes, based on a detection signal from a detector 38, which is described later.

A substance that is a processing object is placed between the electrodes 13 and 14. The processing object is not limited to a particular substance, as long as the substance is at least one of a solid, a liquid, or a gas, and can be a diversity of substances as described later.

[On Electrodes]

Plate-shaped electrodes are in FIG. 1 as an example of the pair of electrodes 13 and 14. However, the form of the electrodes 13 and 14 is not limited to a plate shape and can be foil-like, film-like, or flake-like, and further diverse shapes including a rod-shape, a spherical shape, a hemispherical shape, and a rough L shape can be employed. The electrodes 13 and 14 that are foil-like or film-like can be made very thin, and accordingly require a smaller space to install, are lighter in weight, and are easy to install. Examples of a flake-like electrode include, for example, an electrode shaped like a thin film and overlaid on a given base.

The shape of the electrodes 13 and 14 is not limited to a plate shape and can be any shape. The electrodes 13 and 14 that are foil-like can be molded into any shape to fit the shape of the place in which the electrodes 13 and 14 are installed, for example, a curved shape.

A plurality of through-holes may be formed in the electrodes 13 and 14. With a plurality of through-holes formed in the electrodes, the electrodes can have improved characteristics with regards to the generation of electromagnetic waves from the electrodes, as well as air permeability and, moreover, visibility can be secured through the electrodes. The holes can adopt various shapes including a circular shape, an elliptical shape, or a polygonal shape. For example, hexagonal holes may be formed.

The electrodes 13 and 14 are not limited to a particular material as long as the material is conductive. Examples of a conductive material that is employed include copper, iron, stainless steel, aluminum, titanium, gold, silver, platinum, and other conductive metals, alloys of the conductive metals, conductive oxides, or conductive glass. Surfaces of the electrodes 13 and 14 may be covered with an insulating material. The material of one of the electrodes 13 and 14 may differ from the material of the other of the electrodes 13 and 14. For example, stainless steel may be used as the material of the electrode 13 while the material of the electrode 14 is titanium. Examples of tther possible combinations include stainless steel and aluminum, and stainless steel and copper. The characteristics of electromagnetic waves generated from the electrodes 13 and 14 can be adjusted by changing the materials of the electrodes 13 and 14. The characteristics of the electromagnetic waves can be changed also by switching the material of the electrode 13 and the material of the electrode 14 with each other. The number of electrodes is not limited to two as a pair, and can be one, more than two, two pairs or more, or any suitable number. In this case, too, the characteristics of an electromagnetic wave generated from an electrode can be adjusted by selecting a suitable material for the electrode. When two pairs of electrodes are used, for example, the characteristics of electromagnetic waves generated from the electrodes can be adjusted by using stainless steel as the material of one pair of electrodes and using copper as the material of the other pair of electrodes. The electrodes 13 and 14 generate at least one of an electric field, a magnetic field, an electromagnetic field, an electromagnetic wave, a sonic wave, or a supersonic wave. When the electrodes 13 and 14 are to generate only a sonic wave or a supersonic wave, the material of the electrodes 13 and 14 is not limited to conductive materials and can be an on-conductive material, for example, resin.

A special housing in which the moisture control apparatus 1 is installed may be provided. However, this is not the only option and the moisture control apparatus 1 may be installed in an existing housing, for example. The existing housing in which the moisture control apparatus 1 can be installed can be selected from among various types of housing such as a refrigerator, a freezer, a refrigerated warehouse, a freezer warehouse, a storage building, a refrigerator car, a freezer car, a cooler box, a conveyance container, a storage container, a showcase, a shelf, a drawer, a fryer, a cultivation receptacle (e.g., for use in hydroponics), a fuel tank, a personal computer, a cellular phone, a sofa bed, furniture, bedding, a home appliance, a manufacturing device of a type found in a factory, a fabricating device, a medical device, a health device, a beauty device, a cooking appliance, a polishing device, a vehicle, a washing device for semiconductors, and a device for controlling water vapor that is generated during cooling in a smelting process, a baking process, and a drying process.

In the case of a refrigerator, the pair of electrodes 13 and 14 can be arranged so as to lie along surfaces in the interior of the refrigerator, for example, along opposing side walls, along a ceiling surface, a shelf, and a bottom surface, along a ceiling surface, a bottom surface, and a side surface, or along a door-side inner surface and a side surface at the back. In the case of a fryer, the electrodes 13 and 14 are arranged so as to lie along, for example, the inner left and right side surfaces of an oil receptacle. In short, the pair of electrodes 13 and 14 can be arranged in any manner as long as the electrodes 13 and 14 are opposed to each other. There is no need to arrange the pair of electrodes in parallel to each other and, for example, a positional relation in which the two electrodes are vertical to each other may be used. The two electrodes may be arranged in any manner as long as a space for placing a substance that is a processing object can be provided between the electrodes.

The moisture control apparatus 1 is not required to be installed in a housing and can be installed in any place as long as the pair of electrodes can be arranged in the place. The moisture control apparatus 1 can be installed in any place as long as the pair of electrodes 13 and 14 can be arranged so as to oppose each other, for example, shelves or walls. A partition-like member (not shown), for example, may be used to fix the electrodes 13 and 14.

[On Voltages Applied to the Electrodes]

At least a direct current component voltage is applied to the pair of electrodes 13 and 14 from the controller 10, and an alternating current component voltage may additionally be applied. The direct current component voltage is not particularly limited, and is adjustable between 0 V and 2,000 V, for example. The direct current component voltage may also be adjusted between 0 V and 1,000 V, for example, or between 5 V and 20 V, for example, or between 10 V and 15 V, for example.

The alternating current component voltage may be set to, for example, 0 V so that only the direct current component voltage is applied to the pair of electrodes 13 and 14, to which at least a direct current component voltage is to be applied.

The direct current component voltage can have a plus (+) direction or a minus (−) direction. In at least one embodiment, the direction of the direct current component voltage is plus when the electric potential of the electrode 14 is higher than the electric potential of the electrode 13 (the earth potential), and is minus in the opposite case in which the electric potential of the electrode 14 is lower than the electric potential of the electrode 13. An effect of improving the properties of a substance is obtained both when the direct current component voltage is plus and when the direct current component voltage is minus.

An alternating current component voltage in addition to a direct current component voltage can be applied to the pair of electrodes 13 and 14. The frequency of the alternating current component voltage is not particularly limited, and can be adjusted between 0 Hz and 1 MHz, for example, or between 50 kHz and 200 kHz, for example, or between 50 kHz and 100 kHz, for example.

The alternating current component voltage is not limited to a particular voltage, and the peak-to-peak voltage of the space-charge field per centimeter is adjustable between 0 Vpp/cm and 2,000 Vpp/cm, for example. The voltage may also be adjusted between 50 Vpp/cm and 500 Vpp/cm, for example, or between 100 Vpp/cm and 250 Vpp/cm, for example.

The effect of improving the properties of a substance is high when a direct current component voltage is applied. However, the effect can be obtained also when an alternating current component voltage is applied alone, e.g., by setting the direct current component voltage to 0 V.

As described above, the external power source can be an alternating current power source or a direct current power source irrespective of whether the voltage of the external power source is a direct current voltage or an alternating current voltage. A commercial power source, for example, can be used as the alternating current power source. Batteries including primary batteries and secondary batteries are an example of the direct current power source, and a 12-volt battery, a dry-cell battery, or various other batteries can be used.

Methods of adjusting the voltage value of the direct current component voltage in the controller 10 include, among others, one in which the voltage of the direct current power source is controlled by a DC-DC converter, and one in which the voltage is controlled by a DC-DC converter at the time when, or after, the alternating current power source is rectified by an AC-DC converter. Methods of adjusting the voltage value and frequency of the alternating current component voltage in the controller 10 include, among others, one in which the direct current power source is controlled by a DC-AC converter (inverter), one in which the alternating current power source is rectified by an AC-DC converter and then controlled by a DC-AC converter (inverter), and one in which the alternating current power source is controlled by an AC-AC converter.

When a target voltage value of the direct current component voltage is equal to the power supply voltage of the direct current power source, the exact power supply voltage of the direct current power source may be used as the direct current component voltage. Similarly, when a target voltage and target frequency of the alternating current component voltage are equal to the voltage value and frequency of the power supply voltage of the alternating current power source, the exact power supply voltage of the alternating current power source may be used as the alternating current component voltage.

The direct current component voltage and the alternating current component voltage are added together, in other words, the direct current component voltage is added as an offset voltage to the alternating current component voltage. The added voltages are applied between the pair of electrodes 13 and 14. Alternatively, the direct current component voltage may be controlled when the alternating current component voltage is controlled in power conversion with the use of a DC-AC converter, for example.

[On Control with the Controller]

The moisture control apparatus 1 is driven by the controller 10 to generate an electric field between the pair of electrodes 13 and 14. The electrodes 13 and 14 at this point function as antennas, and an electromagnetic field is generated by the emission of an electromagnetic wave between the electrodes 13 and 14. A sonic wave and/or a supersonic wave can be generated between the electrodes as well by vibrating the electrodes 13 and 14 with electrical, magnetic, or mechanical means. A piezoelectric element can also be used as means for generating a sonic wave and/or a supersonic wave between the electrodes. At least one out of an electric field, a magnetic field, an electromagnetic field, an electromagnetic wave, a sonic wave, or a supersonic wave is accordingly generated between the electrodes 13 and 14. The effect of improving the characteristics of a substance is enhanced by using a sonic wave and/or a supersonic wave in addition to an electric field, a magnetic field, an electromagnetic field, or an electromagnetic wave.

The controller 10 performs feedback control on at least one of the current value, voltage value, frequency, or phase of a voltage/current applied to the electrodes, based on a detection signal from the detector 38. The detector 38 includes at least one of a voltage sensor, which detects a voltage applied to the electrodes, a current sensor, which detects a current applied to the electrodes, a frequency sensor, which detects the frequency of a voltage and/or current applied to the electrodes, a phase sensor, which detects the phase of a voltage and/or current applied to the electrode, a magnetic field sensor, which detects a magnetic field between the electrodes 13 and 14, an electric field sensor, which detects an electric field between the electrodes 13 and 14, a sonic wave sensor, which detects the magnitude or frequency of a sonic wave between the electrodes 13 and 14, or a supersonic wave sensor, which detects the magnitude or frequency of a supersonic wave between the electrodes 13 and 14.

A control target value suitable for the type or state of a substance that is a processing object is set for at least one of the current value, the voltage value, the frequency, or the phase in the controller 10. The control target value can be set remotely via a communication instrument (not shown). A control parameter and control amount of the controller 10 can also be controlled remotely. This enables the server 40 that is in a remote site to control the controllers 10 of the plurality of moisture control apparatus 1 in a centralized manner, so that each controller 10 can be controlled properly. The mode of control of each controller 10 is not limited to remote control from the server 40 and, for instance, the controller 10 of each moisture control apparatus 1 may be controlled individually by setting a control target value and a control parameter directly to the controller 10.

The controller 10 is provided with the storage 37 in which a control program is stored. The controller 10 is controlled based on the control program. The control program is rewritable through communication or via a storage medium, and can accordingly be updated and upgraded to a new version as required. The controller 10 and the server 40 can hold communication to and from each other, and the storage 37 stores a control parameter, control amount, control program, or various set values sent from the server 40. The control program can be stored on a suitable non-transitory storage medium.

Figure 2A:
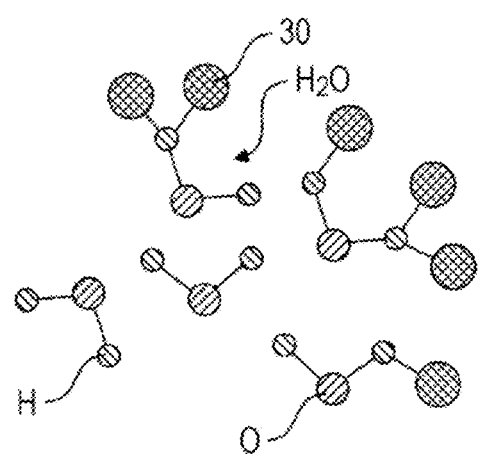
FIG. 2A A schematic diagram of water molecules in which freely moving water molecules in at least one embodiment of this disclosure.
Figure 2B:
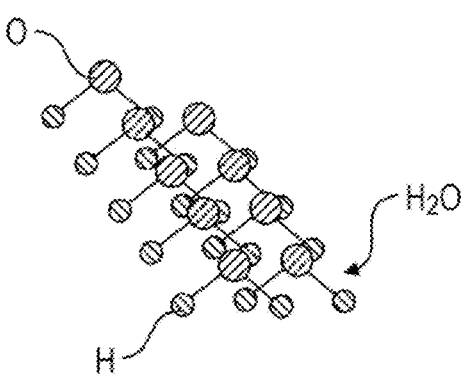
FIG. 2B A schematic diagram of water molecules in a pearl chain formation in at least one embodiment of this disclosure.

FIG. 2A is a schematic diagram of water molecules in which freely moving water molecules. FIG. 2B is a schematic diagram of water molecules in a pearl chain formation.

A substance that is a processing object, for example, meat, fish, vegetables, and other types of food, drinks, animal cells, plant cells, and oil, contains water molecules as moisture in the form of free water or other forms.

Water molecules (H₂O) are normally aligned irregularly as in FIG. 2A. This lets a hydrogen atom H take in reactive oxygen 30 or form a hydrogen bond, thereby increasing the size of the water molecule and slowing down the motion of the water molecule. Oxidization of the water molecule is then started.

When an electric field is generated between the pair of electrodes 13 and 14, on the other hand, water molecules are aligned in a certain direction determined by the phase and direction of an electrical field applied by the pair of electrodes 13 and 14. This is because, in a water molecule, oxygen atoms O, which strongly attract electrons, are charged slightly negatively and the hydrogen atom H, which readily releases electrons, is charged slightly positively, and the oxygen atoms and the hydrogen atom each attempt to align in the direction of the electric field between the electrodes 13 and 14.

Water molecules change directions alternatingly when an alternating current component voltage is generated by the controller 10. The water molecules in this case change directions at the same frequency as the frequency of the alternating current component voltage, which makes the water molecules appear to be vibrating. With the repetition of this vibration, a hydrogen bond of a water molecule to the active oxygen 30 or to another component is broken and each water molecule is gradually granulated in a regular pattern to be aligned as in FIG. 2B.

A similar action is observed also between water particles (minute water drops) as moisture existing in a substance in the form of free water or other forms. The electric field between the pair of electrodes 13 and 14 accordingly causes water particles to form a pearl chain formation by attracting one another.

When a direct current component voltage is applied between the pair of electrodes 13 and 14, there is a component force by which water molecules attempt to align in the direction of an electric field caused by the direct current component voltage. Water molecules are therefore aligned in a regular pattern also when a direct current component voltage alone is applied between the pair of electrodes 13 and 14. When an alternating current component voltage is further applied in addition to the direct current component voltage, the water molecules change directions at the same frequency as the frequency of the alternating current component voltage, and there is also a component force by which the water molecules attempt to align in one direction, thus making the water molecules more likely to align in a regular pattern. The same applies to the state of water particles, and an electric field between the pair of electrodes 13 and 14 causes water particles as moisture in the form of free water or other forms to form a pearl chain formation by attracting one another.

Water molecules change directions at the same frequency as the frequency of an alternating current component voltage and consequently seem as though the water molecules are vibrating also when the voltage applied between the pair of electrodes 13 and 14 includes the alternating current component voltage alone and no direct current component voltage. With the repetition of this vibration, a hydrogen bond of a water molecule to the active oxygen 30 or to another component is broken and each water molecule is gradually granulated in a regular pattern to be aligned. When the voltage applied between the pair of electrodes 13 and 14 includes an alternating current component voltage alone and no direct current component voltage, the alternating current component voltage works in the same way on the state of water particles, and an electric field between the pair of electrodes 13 and 14 causes water particles as moisture in the form of free water or other forms to form a pearl chain formation by attracting one another.

A sonic wave or a supersonic wave has the action of vibrating water molecules. An effect of accelerating the alignment of water molecules is accordingly obtained by additionally generating a sonic wave and/or supersonic wave of a given frequency and a given intensity between the pair of electrodes 13 and 14 when a direct current component voltage and/or an alternating current component voltage is applied between the electrodes. Water molecules vibrated by a given sonic wave and/or supersonic wave can be arrayed without the application of a voltage between the electrodes.

Water can be divided into "bound water" and "free water". Bound water is in a stable state by forming a hydrogen bond with another component. Free water, on the other hand, is in a state that allows free movement of the water molecule. When a substance containing free water is food, the food is fresh and succulent. However, a molecule of free water readily forms a bond with another component, and food containing free water is consequently more susceptible to decomposition. Specifically, a germ, a virus, a microbe, or active oxygen bonds with free water to accelerate decay. Bound water, too, turns into free water with the passage of time, with a rise in temperature, or in a dry environment, and the change from bound water into free water removes part of a cell component with which a hydrogen bond was previously formed, thereby facilitating decomposition. Freshness can accordingly be maintained by putting free water into a bonded state (to be discriminated from the "state of bound water" described above) in which water molecules are in a pearl chain formation, or into a state in which a bond with another cell or the like is formed.

Water molecules arranged into a pearl chain formation by the moisture control apparatus 1 according to at least one embodiment form a structure in which free water and free water bond with each other to create a stable state similar to that of bound water. In other words, water molecules aligned in a regular pattern by the moisture control apparatus 1 according to at least one embodiment do not bond with other components while being held within a substance, and are therefore capable of keeping the food fresh and succulent.

The alignment of water molecules of free water in a substance can accordingly be controlled in a receptacle in which the moisture control apparatus 1 according to at least one embodiment is installed and, when the substance is food, a drug, or a cell, the freshness of the food, the drug, or the cell can be maintained. For example, food can maintain freshness during transportation for a longer distance than before by using the moisture control apparatus 1 as a transportation receptacle. The receptacle may be made of, for example, polystyrene foam, and a transportation receptacle can be constructed by mounting the moisture control apparatus 1 according to at least one embodiment to an existing polystyrene foam receptacle or the like.

Water molecules once aligned in a regular pattern by the moisture control apparatus 1 according to at least one embodiment retain the regularly aligned state for several days. Food, a drug, or a cell as a substance that is a processing object can accordingly maintain freshness even when the food, the drug, or the cell is moved to a different receptacle for storage after water molecules of free water in the food, the drug, or the cell are arranged into a pearl chain formation by the moisture control apparatus 1 according to at least one embodiment.

Water molecules in the moisture of a substance are electrically arrayed and oriented in a substantially fixed direction (the direction of the electric field) by the application of a given voltage to the electrodes 13 and 14. With the water molecules arrayed, the conductivity of the substance increases. Water molecules in a substance that is liquid can be arrayed as well, which means that the conductivity of pure water, for example, can be raised. In addition, water molecules in an electric field vibrate finely at a certain frequency, and are consequently not crystallized around 0° C.

The application of a given voltage to the electrodes 13 and 14 also helps to prevents water molecules in a substance to form a hydrogen bond and, with hydrogen bonds reduced in number, physiological water, for example, can be obtained. The addition of fine bubbles, micro-nano bubbles, nanobubbles, or the like to this water yields water with even more sophisticated functions. The sophistication of functions of a liquid by an electric field and fine bubbles is not limited to water and is applicable to, for example, aqueous solutions, emulsions, and oils as well.

The application of a given voltage to the electrodes 13 and 14 also accelerates hydration with water molecules in the moisture of a substance. For example, protein contained in a substance is hydrated and bonds with water molecules to be surrounded by water molecules. This state prevents the substance from deteriorating.

Figure 3A:
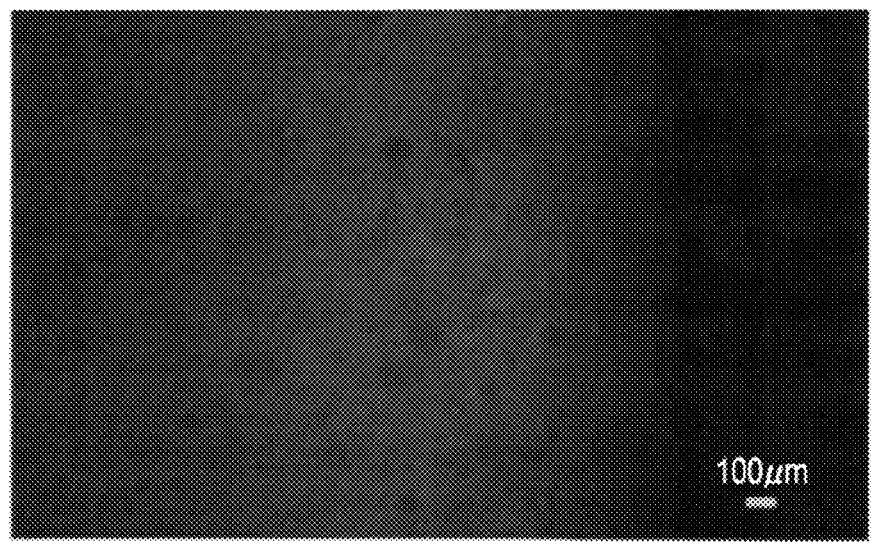
FIG. 3A A micrograph of free water in the state of free water prior to the application of an electric field in at least one embodiment of this disclosure.
Figure 3B:
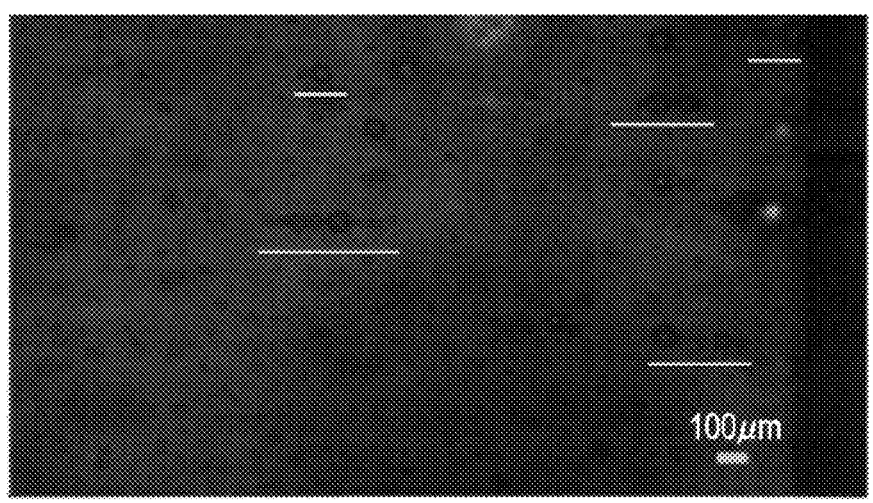
FIG. 3B A micrograph of free water in the state of free water at the time of application of an electric field in at least one embodiment of this disclosure.

FIG. 3A is a micrograph of free water in the state of free water prior to the application of an electric field. FIG. 3B is a micrograph of free water in the state of free water at the time of application of an electric field. In free water to which an electric field is applied, a pearl chain formation of water particles is confirmed in places marked by white underlines as shown in FIG. 3B. In free water to which an electric field is yet to be applied, on the other hand, a pearl chain formation of water particles is not confirmed as shown in FIG. 3A. FIGS. 3A and 3B indicate that the moisture control apparatus 1 according to at least one embodiment is capable of arranging water particles of free water into a pearl chain formation.

Figure 4B:
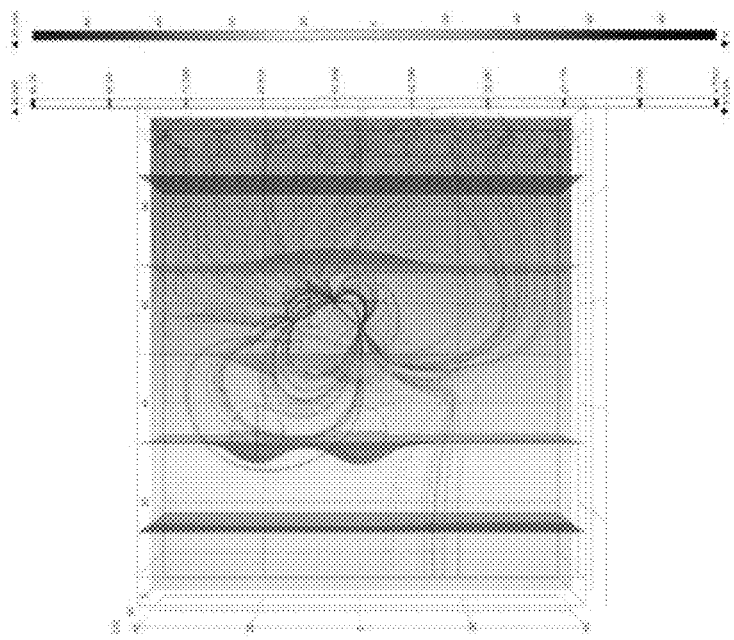
FIG. 4B A result of the electric potential simulation in at least one embodiment of this disclosure.
Figure 4A:
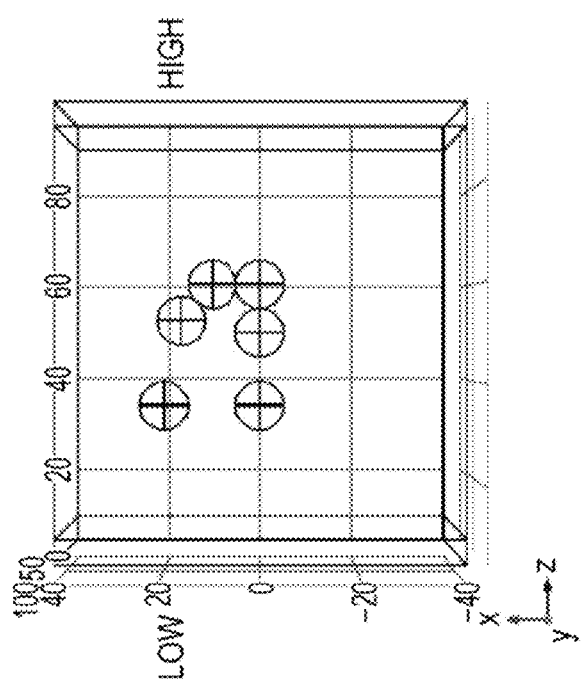
FIG. 4A An explanatory diagram of a simulation model of a result of simulation about the electric potential of water particles in at least one embodiment of this disclosure.

FIG. 4A is an explanatory diagram of a simulation model of a result of simulation about the electric potential of water particles. FIG. 4B is a result of the electric potential simulation. The simulation model has, as free water, four water particles in a pearl chain formation at a central portion and two independent water particles to the left of the aligned water particles as in FIG. 4A.

Three equipotential areas in vertical sections along a longitudinal direction of water particles are in FIG. 4B. In a part of the right-most section, water particles are in a pearl chain formation, and it can be seen that the water particles in a pearl chain formation are equipotential. Areas of four water particles forming a pearl chain formation in a central portion of FIG. 4B are colored in substantially the same color, which indicates that the areas of the four water particles in a pearl chain formation are substantially equipotential.

Electric flux lines run in the four water particles forming a pearl chain formation, which indicates that the four water particles attract one another. Electric flux lines from the four water particles forming a pearl chain formation also run in two independent water particles, which are located at a distance to the left of the four water particles forming a pearl chain formation. This implies that a force is working in a direction in which the two independent water particles are attracted to the four water particles forming a pearl chain formation, and there is a possibility that the two independent water particles join the four water particles forming a pearl chain formation.

Figure 5:
FIG. 5 A photograph of the result of preserving sea bream for 5 days in at least one embodiment of this disclosure.

FIG. 5 is a photograph of the result of preserving sea bream for 5 days. The result of preservation in an ordinary refrigerator is shown on the left side of the photograph, and a case in which an electromagnetic field is applied by the moisture control apparatus 1 according to at least one embodiment is shown on the right side of the photograph. The sea bream on the left side of the photograph is decomposed due to a bond between a germ, a virus, or active oxygen and free water. On the right side of the photograph, on the other hand, water particles as free water are arranged in a pearl chain formation, and a germ, a virus, or active oxygen is consequently separated from free water, which slows down decomposition.

A comparison has been made between sea bream preserved in an ordinary refrigerator for 48 hours and sea bream preserved for 47 hours after an electromagnetic field is applied for an hour by the moisture control apparatus 1 according to at least one embodiment. The comparison reveals that the latter is slower in the progression of decay. This indicates that, once water particles as free water in a substance are arranged into a pearl chain formation with the application of an electromagnetic field to the substance by the moisture control apparatus 1 according to at least one embodiment, the water particles maintain the pearl chain formation for a given length of time after the substance is taken out of the electromagnetic field.

Figure 6:
FIG. 6 A set of photographs of the result of preserving bean sprouts for 10 days in at least one embodiment of this disclosure.

FIG. 6 is a photograph of the result of preserving bean sprouts for 10 days. The result of preservation in an ordinary refrigerator is shown on the left photograph, and a case in which an electromagnetic field is applied by the moisture control apparatus 1 according to at least one embodiment is shown on the right photograph. In the left photograph, free water contained in the bean sprouts has leaked and the amount of moisture dripped is 27 g. In the right photograph, on the other hand, water particles as free water contained in the bean sprouts are arranged in a pearl chain formation, which means that the free water is held inside the bean sprouts, and the amount of moisture dripped is 1 g.

Figure 7:
FIG. 7 A set of photographs of the result of preserving pea sprouts for 35 days in at least one embodiment of this disclosure.

FIG. 7 is a photograph of the result of preserving pea sprouts for 35 days. The result of preservation in an ordinary refrigerator is shown on the left photograph, and a case in which an electromagnetic field is applied by the moisture control apparatus 1 according to at least one embodiment is shown on the right photograph. In the left photograph, free water contained in the pea sprouts has drained, resulting in the loss of freshness and a reduction of weight by 15% due to the evaporation of moisture. In the right photograph, water particles as free water contained in the pea sprouts are arranged in a pearl chain formation to bond with one another, which makes it hard for the free water to evaporate and accordingly keeps the pea sprouts fresh. The weight reduction in the right photograph is kept at 8%.

[On the Lowering of Interfacial Tension]

The interfacial tension in a W/O emulsion (for example, minute water drops in cooking oil) can be lowered with the application of an electromagnetic field by the moisture control apparatus 1 according to the first embodiment. The interfacial tension in this case can be lowered by, for example, 10% or more and, depending on conditions of the electromagnetic field, 20% or more. The interfacial tension can even be lowered by 60% or more by, for example, controlling the direct current component voltage and the alternating current component voltage properly. This is considered to be due to an increase in interfacial polarization caused by the application of the electromagnetic field.

For example, when moisture contained in food that is being cooked in cooking oil turns into water vapor in the cooking oil, water drops escaping the food into the cooking oil are minute water drops. When interfacial polarization is caused in the minute water drops at a level enough to lower the interfacial tension, dipole-dipole attraction causes the minute water drops to form a pearl chain formation.

When food is fried in cooking oil with the use of a fryer, the interfacial tension at the oil-water boundary can be lowered by installing the pair of electrodes 13 and 14 of the moisture control apparatus 1 according to at least one embodiment in the fryer. Moisture contained in food that is being cooked in cooking oil generally turns into water vapor in the cooking oil, thereby causing a sudden boil-up. The moisture control apparatus 1 according to the first embodiment is capable of lowering the surface tension at the oil-water boundary by generating a given electromagnetic field. This facilitates the dispersion of moisture escaping the food throughout the cooking oil in the form of minute bubbles small in particle size. The scale of the sudden boil-up is accordingly reduced despite the vaporization of the moisture into water vapor in the cooking oil in which the moisture is heated. The application of the electromagnetic field also hinders the escape of moisture from food by causing water particles of free water that is contained in food to form a pearl chain formation. An effect of reducing the permeation of the oil into food is thus obtained by preventing sudden boil-up through the control of moisture contained in the food. Further, because of the effect, the cooked food acquires truly excellent texture and flavor.

Figure 8:
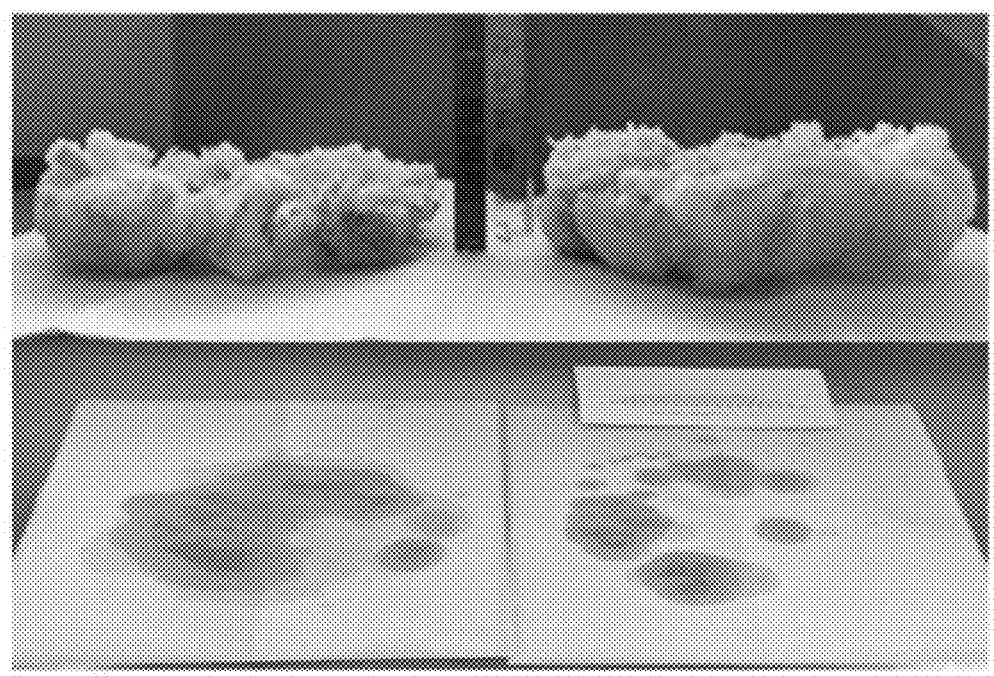
FIG. 8 A set of photographs of the state of food cooked in cooking oil in at least one embodiment of this disclosure.

FIG. 8 is a photograph for showing the state of oil in food cooked in cooking oil. An appearance of food cooked in a fryer of the related art is shown in an upper left portion of the photograph. How food cooked in a fryer looks when the pair of electrodes 13 and 14 of the moisture control apparatus 1 according to at least one embodiment is installed in the fryer is shown in an upper right portion of the photograph. Appearances of pieces of oil absorbent paper left under cooked food are shown in lower portions of the photograph. The oil stain in a lower right portion of the photograph is smaller than the oil stain in a lower left portion of the photograph. One of ordinary skill in the art would recognize that the oil absorption amount is smaller in the upper right food, which is the food cooked with the use of the moisture control apparatus 1 according to at least one embodiment, than in the upper left food, which is the food cooked with the fryer of the related art. The oil absorption amount of the food cooked with the use of the moisture control apparatus 1 according to at least one embodiment is approximately 50% less than the oil absorption amount of the food cooked with the fryer of the related art. This indicates that, through use of the moisture control apparatus 1 according to at least one embodiment, food cooked in cooking oil can keep a favorable texture for a longer time after the cooking, and is reduced in oil content. The reduced oil content in the food helps to reduce the oil intake, which is beneficial from the standpoint of health.

[On Applicable Objects]

The effect of controlling arrangement of water molecules of free water is not limited to food, and the adoptable substance may be, for example, at least one selected from the group consisting of:

(1) one of articles of food including agricultural products, flowers, animal products, aquatic products, processed food, health food, beverages, alcoholic drink, dry foods, stocks, and seasoning, (2) one of products including resin, rubber, glass, lenses, pottery, lumber, cement, concrete, paper, ink, dye, fibers, ceramics, polishing agents, washing agents, additives, printed boards, plating, refining materials, paint, Chinese ink, water repellents, chemical products, fertilizer, animal feed, microbes, water, cloth, and explosives, (3) fuel including gasoline, light gas oil, heavy fuel oil, kerosene, and petroleum, (4) one of medical products including blood, vaccines, drugs, organs, cells, ointments, dialyzers, and medical treatment instruments, and (5) one of commodities including beauty products, detergents, soaps, shampoos, and hair care products.

However, the group is not limited thereto, and the effect may be applied to any other substance as long as the substance includes free water.

For example, water particles of free water contained in pottery are arranged into a pearl chain formation with the use of an electromagnetic field, thereby enabling the pottery to retain free water and consequently reducing cracks in the pottery. Similarly, cement and concrete can be enhanced in strength and reduced in the number of cracks by arranging water particles of free water contained in the substance into a pearl chain formation through the application of an electromagnetic field.

When an electromagnetic field is applied to fuel, for example, gasoline or light gas oil, the surface tension in the W/O emulsion is lowered, and water particles are consequently turned into minute water drops, which are small in particle size and easy to disperse. The application of the electromagnetic field also causes the water particles to together form a pearl chain formation, thereby enhancing a fuel quality improvement effect and improving fuel efficiency.

When an electromagnetic field is applied to, for example, blood, a vaccine, a drug, an organ, a cell, or a similar substance to arrange water particles of free water contained in the substance into a pearl chain formation, the substance can be stored in a favorable state for a longer storage period.

The application of an electromagnetic field to, for example, a beauty product turns water particles contained in the beauty product into minute water drops, which are small in particle size and easy to disperse. The application of the electromagnetic field also puts the minute water drops into a pearl chain formation, thereby improving the characteristics of the beauty product.

Further, the moisture control apparatus 1 may be applied to, for example, at least one field out of a manufacturing field, a distribution field, a logistics field, a storage field, a sales field, an industrial field, a construction field, a civil engineering field, a machine field, an electricity field, an electronics field, a communications field, an optics field, a chemistry field, a petroleum chemistry field, an agricultural field, a mercantile field, a fisheries field, a food field, a food service field, a culinary field, a service field, a medical field, a health field, a welfare field, or a nursing care field. However, the field is not limited thereto, and the moisture control apparatus can be applied to any other field dealing with a wider variety of substances.

Figure 9:
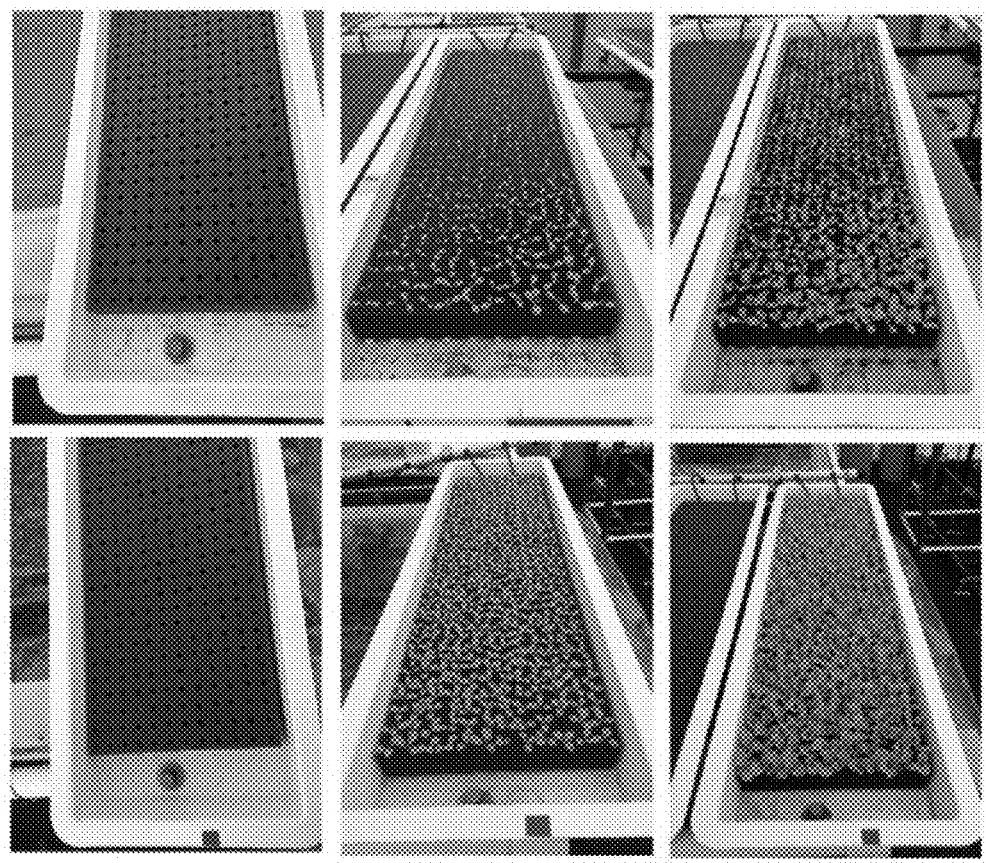
FIG. 9 A set of photographs of result of hydroponics in at least one embodiment of this disclosure.

FIG. 9 is a comparison result of hydroponics. Upper three photographs are pictures of a cultivation method of the related art, and lower three photographs are pictures of a cultivation method in which water is processed by the moisture control apparatus 1 according to at least one embodiment. The three photographs in the upper row and the lower row each are, from left to right, a photograph of Day 1, a photograph of Day 7, and a photograph of Day 12. In the case of the cultivation method of the related art (the upper three photographs of FIG. 9), the growth of a leaf vegetable varies from location to location, and algae has developed as well. With the cultivation method in which water is treated by the moisture control apparatus 1 according to at least one embodiment (the lower three photographs), on the other hand, the leaf vegetable has grown finely at a fast rate that is uniform irrespective of location, and there is less development of algae.

The moisture control apparatus 1 according to at least one embodiment, when applied to the medical field, for example, is effective in artificial dialysis, diabetes treatment, the reduction/prevention of bed sores, the reduction/prevention of necrosis, and the reduction/prevention of a circulatory organ problem, for example.

Figure 10:
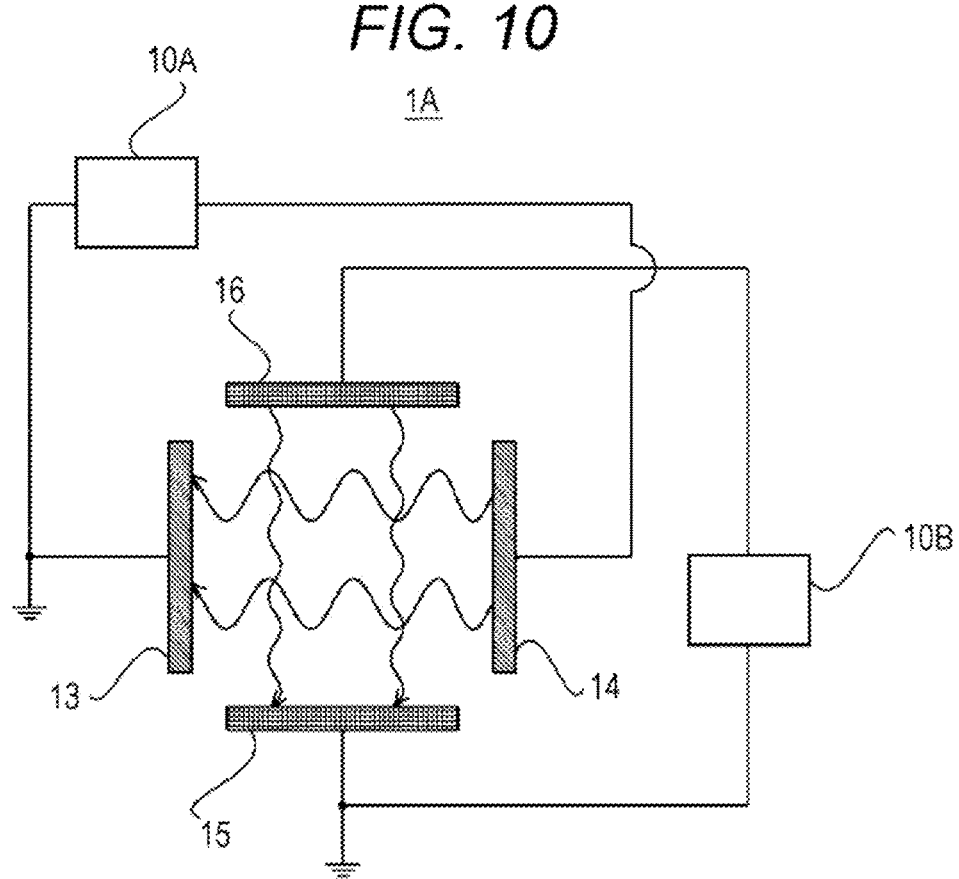
FIG. 10 A conceptual diagram of an electrode in at least one embodiment of this disclosure.

A moisture control apparatus, a moisture control method, a program, a storage medium, a generated substance, a product, an apparatus, and an equipment according to at least one embodiment are described with reference to FIG. 10. FIG. 10 is a conceptual diagram of an electrode according to at least one embodiment. The same components as those in FIG. 1 to FIG. 9 are denoted by the same reference symbols, and descriptions of the components are omitted. The moisture control apparatus in FIG. 10 includes two pairs of electrodes.

A moisture control apparatus 1A includes controllers 10A and 10B and, as two pairs of electrodes, first electrodes 13 and 14 and second electrodes 15 and 16. The controllers 10A and 10B each include an alternating current component voltage generator and a direct current component voltage generator. The alternating current component voltage generator and the direct current component voltage generator are not required to be provided separately in an actual circuit configuration of the controller 10, and a circuit configuration in which a single unit has the functions of the two can be employed. The two controllers 10A and 10B may be configured as a single controller. The single controller may apply a voltage to the first electrodes 13 and 14 and the second electrodes 15 and 16 both as long as the same electromagnetic wave is generated from the first electrodes 13 and 14 and from the second electrodes 15 and 16.

The moisture control apparatus 1A is driven by the controllers 10A and 10B to generate an electric field between the pair of first electrodes 13 and 14 and an electric field between the pair of second electrodes 15 and 16. The electrodes 13 to 16 at this point function as antennas, and an electromagnetic field is generated by the emission of an electromagnetic wave between the first electrodes 13 and 14 and between the second electrodes 15 and 16 each. At least one out of an electric field, a magnetic field, an electromagnetic field, or an electromagnetic wave is accordingly generated between the electrodes 13 and 14 and between the electrodes 15 and 16. As described above, a sonic wave and/or a supersonic wave can be generated between the electrodes 13 and 14 as well by vibrating the electrodes with electrical, magnetic, or mechanical means. Water molecules vibrated by a given sonic wave and/or supersonic wave can be arrayed without the application of a voltage between the electrodes.

A substance that is a processing object is placed between the first electrodes 13 and 14 and between the second electrodes 15 and 16. As described above, the processing object is not limited to a particular substance, as long as the substance is at least one of a solid, a liquid, or a gas. When the moisture control apparatus 1A according to at least one embodiment is installed in a refrigerator, the first electrodes 13 and 14 can be installed on inner side surfaces of the refrigerator while the second electrodes 15 and 16 are installed on the refrigerator's inner ceiling surface, inner bottom surface or shelf, for example. The first electrodes 13 and 14 and the second electrodes 15 and 16 in FIG. 10 are arranged so as to be orthogonal to each other. However, this disclosure is not limited thereto, and the first electrodes 13 and 14 and the second electrodes 15 and 16 can be arranged in any manner as long as at least a part of an electromagnetic field generated by the first electrodes 13 and 14 and an electromagnetic field generated by the second electrodes 15 and 16 works on a substance that is a processing object.

The controllers 10A and 10B perform feedback control on at least one of the current value, voltage value, frequency, or phase of a voltage/current applied to the electrodes, based on a detection signal from a detector (not shown). The detector includes at least one of a voltage sensor, which detects a voltage applied to the electrodes, a current sensor, which detects a current applied to the electrodes, a frequency sensor, which detects the frequency of a voltage and/or current applied to the electrodes, a magnetic field sensor, which detects a magnetic field between the electrodes 13 and 14 and a magnetic field between the electrodes 15 and 16, an electric field sensor, which detects an electric field between the electrodes 13 and 14 and an electric field between the electrodes 15 and 16, a voltage phase detection sensor, a current phase detection sensor, or a voltage phase-current phase detection sensor.

A control target value suitable for the type or state of a substance that is a processing object is set for at least one of the current value, the voltage value, the frequency, or the phase in the controllers 10A and 10B. The current value, voltage value, frequency, and phase of a voltage/current applied by the controller 10A to the first electrodes 13 and 14 may be the same as or differ from the current value, voltage value, frequency, and phase of a voltage/current applied by the controller 10B to the second electrodes 15 and 16. Various combinations can be adopted, for example, one in which the voltage applied by the controller 10A and the voltage applied by the controller 10B differ from each other in voltage value and frequency, one in which the voltage/current applied by the controller 10A and the voltage/current applied by the controller 10B differ from each other in frequency alone, and one in which the voltage/current applied by the controller 10A and the voltage/current applied by the controller 10B differ from each other in frequency and phase.

The control target value can be set remotely via a communication instrument (not shown). Control parameters and control amounts of the controllers 10A and 10B can also be controlled remotely. This enables the server 40 that is in a remote site to control the controllers 10A and 10B of the plurality of moisture control apparatus 1A in a centralized manner, so that each pair of controllers 10A and 10B can be controlled properly. The mode of control of the controllers 10A and 10B is not limited to remote control from the server 40 and, for instance, the controllers 10A and 10B of each moisture control apparatus 1A may be controlled individually by setting a control target value and a control parameter directly to the controllers 10A and 10B.

Figure 11A:
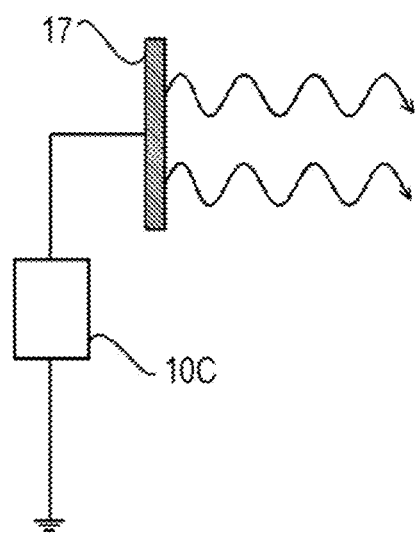
FIG. 11A A conceptual diagram of electrodes in at least one embodiment of this disclosure.
Figure 11B:
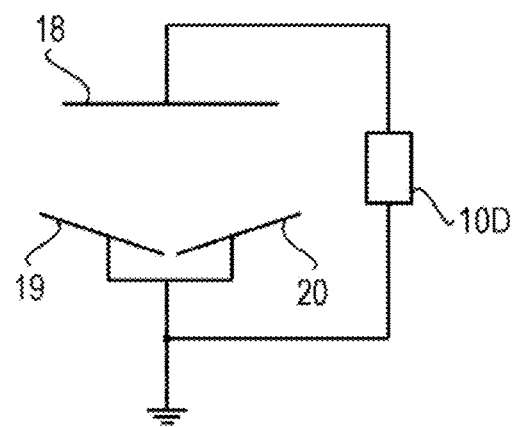
FIG. 11B A conceptual diagram of electrodes in at least one embodiment of this disclosure.

FIG. 11A is a conceptual diagram of electrodes using one electrode in at least one embodiment of this disclosure. FIG. 11B is a conceptual diagram of two electrodes opposed to the one electrode in at least one embodiment of this disclosure. This disclosure is not limited to the example in which one pair of electrodes is used and the example in which two pairs of electrodes are used. An odd number of electrodes, for example, one electrode or three electrodes, may be used as in FIGS. 11A and 11B. For instance, an electromagnetic wave can be generated also by a single electrode 17 in FIG.

11A. When three electrodes are used, two electrodes, 19 and 20, may be opposed to one electrode 18, as in FIG. 11B, or all three electrodes may generate different electromagnetic waves. The number and arrangement of electrodes can thus be set at one's discretion and are not limited.

Figure 12B:
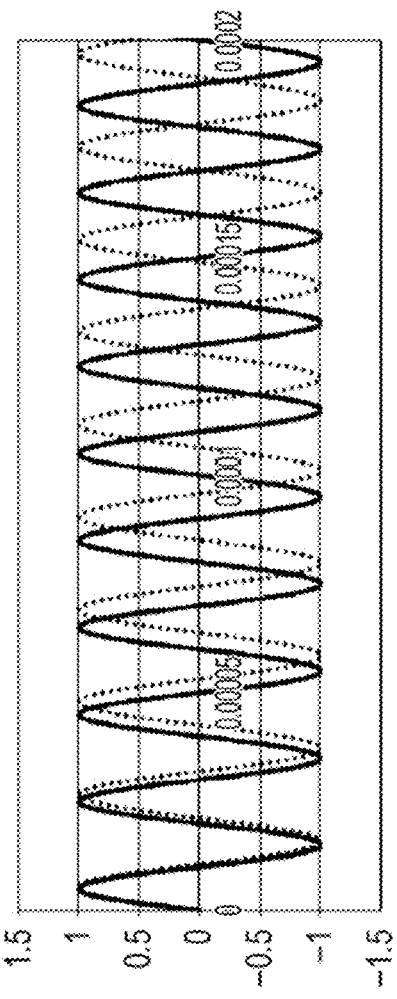
FIG. 12B A wave form chart observed when voltages having different frequencies are used in at least one embodiment of this disclosure.

A moisture control apparatus, a moisture control method, a program, a storage medium, a generated substance, a product, an apparatus, and an equipment according to at least one embodiment of this disclosure are described with reference to FIG. 12 and FIG. 13. FIGS. 12A-D are wave form charts observed when voltages having different frequencies are used in at least one embodiment. FIG. 13 are wave form charts observed when voltages having different phases are used in at least one embodiment. The same components as those in FIG. 1 to FIG. 11 are denoted by the same reference symbols, and descriptions of the components are omitted. A moisture control apparatus 1B according to at least one embodiment includes a different electromagnetic wave is generated from each of two electrodes forming a pair.

Figure 12C:
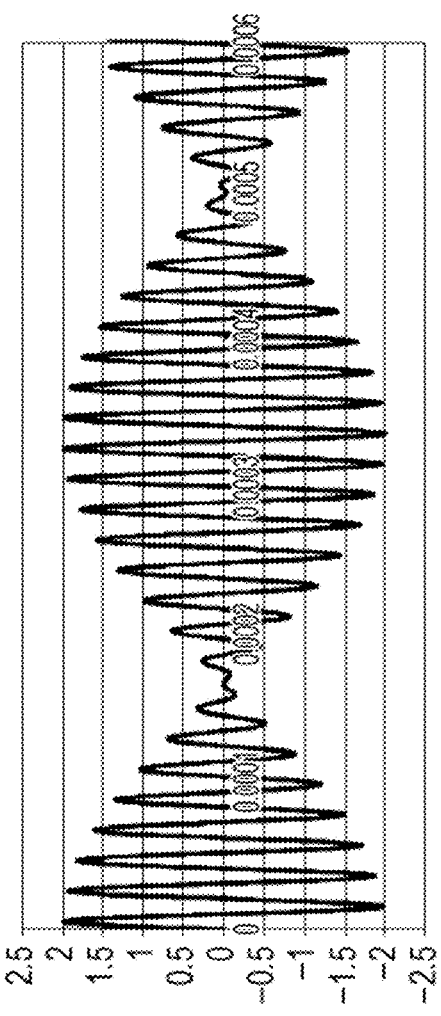
FIG. 12C A wave form chart observed when voltages having different frequencies are used in at least one embodiment of this disclosure.
Figure 12A:
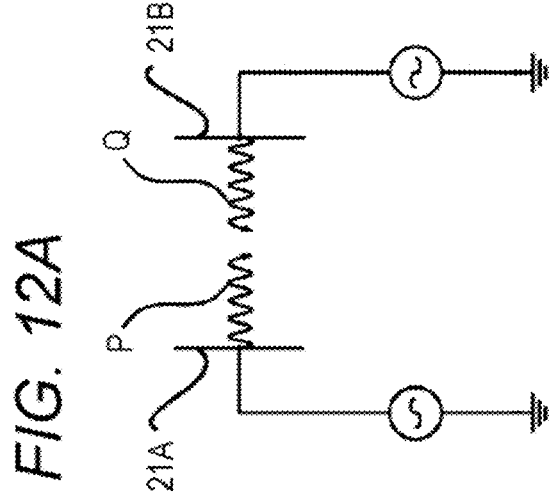
FIG. 12A A conceptual diagram of a wave form chart observed when voltages having different frequencies are used in at least one embodiment of this disclosure.

In FIGS. 12A-12D, an electromagnetic wave (a P-wave) having a frequency of 50 kHz is generated from an electrode 21A, which is one of a pair of electrodes 21A and 21B, and an electromagnetic wave (a Q-wave) having a frequency of 47 kHz is generated from the other electrode 21B. When the amplitude of an electromagnetic wave is given as A, the P-wave and the Q-wave are expressed by the following expressions, which express the waves at a point where V(t) of the P-wave and V(t) of the Q-wave are both 0 (for example, the exact midpoint between the electrodes 21A and 21B) at a time t=0:

$V(t)=A\sin(2\pi f_1 t), f_1=50$ kHz  P-wave:

$V(t)=A\sin(2\pi f_2 t), f_2=47$ kHz  Q-wave:

An electromagnetic wave that is a combination of the P-wave and the Q-wave is accordingly applied between the pair of electrodes 21A and 21B as in FIG. 12C.

Figure 13B:
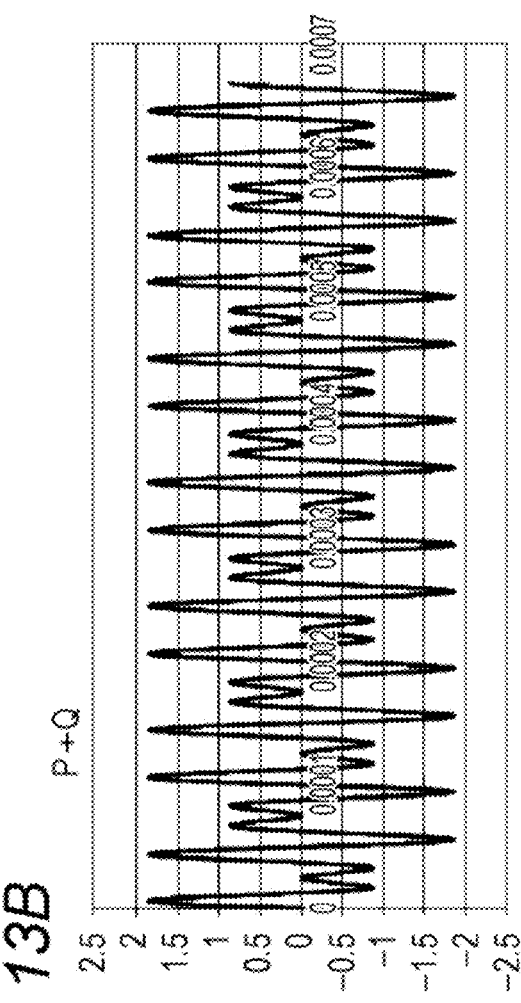
FIG. 13B A wave form chart observed when voltages having different frequencies are used in at least one embodiment of this disclosure.
Figure 13D:
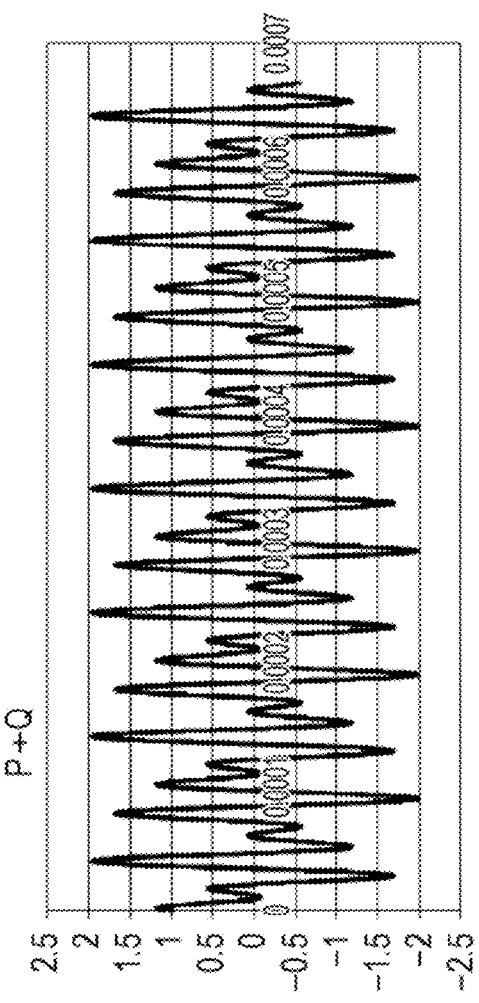
FIG. 13D A wave form chart observed when voltages having different frequencies are used in at least one embodiment of this disclosure.
Figure 13A:
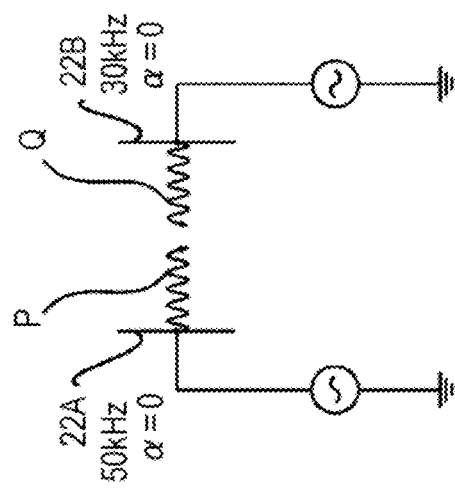
FIG. 13A A conceptual diagram of a wave form chart observed when voltages having different frequencies are used in at least one embodiment of this disclosure.

In FIG. 13A and FIG. 13B, an electromagnetic wave (a P-wave) having a frequency of 50 kHz is generated from an electrode 22A, which is one of a pair of electrodes 22A and 22B, and an electromagnetic wave (a Q-wave) having a frequency of 30 kHz is generated from the other electrode 22B. The phases α of those waveforms are both 0. When the amplitude of an electromagnetic wave is given as A, the P-wave and the Q-wave are expressed by the following expressions, which express the waves at a point where V(t) of the P-wave and V(t) of the Q-wave are both 0 (for example, the exact midpoint between the electrodes 22A and 22B) at a time t=0:

$V(t)=A\sin(2\pi f_1 t), f_1=50$ kHz  P-wave:

$V(t)=A\sin(2\pi f_2 t), f_2=30$ kHz  Q-wave:

An electromagnetic wave that is a combination of the P-wave and the Q-wave is accordingly applied between the pair of electrodes 22A and 22B as in FIG. 13B.

Figure 13C:
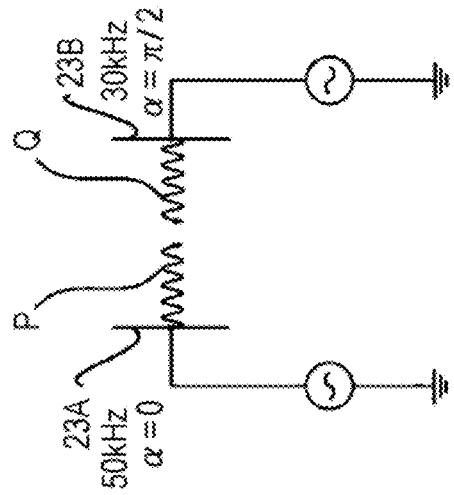
FIG. 13C A conceptual diagram of a wave form chart observed when voltages having different frequencies are used in at least one embodiment of this disclosure.

In FIG. 13C and FIG. 13D, an electromagnetic wave (a P-wave) having a frequency of 50 kHz and a phase of α=0 is generated from an electrode 23A, which is one of a pair of electrodes 23A and 23B, and an electromagnetic wave (a Q-wave) having a frequency of 30 kHz and a phase of α=π/2 is generated from the other electrode 23B. That is, the phases of those waveforms are both set to π/2. When the amplitude of an electromagnetic wave is given as A, the P-wave and the Q-wave are expressed by the following expressions, which express the waves at a point where V(t) of the P-wave is 0 and V(t) of the Q-wave is A (for example, the exact midpoint between the electrodes 23A and 23B) at a time t=0:

$V(t)=A\sin(2\pi f_1 t), f_1=50$ kHz  P-wave:

$V(t)=A\sin(2\pi f_2 t+\pi/2), f_2=30$ kHz  Q-wave:

An electromagnetic wave that is a combination of the P-wave and the Q-wave is accordingly applied between the pair of electrodes 23A and 23B as in FIG. 13D.

This disclosure is not limited to the examples of FIG. 12, FIG. 13A, and FIG. 13B in which electromagnetic waves generated from two electrodes each have a different frequency, and the examples of FIG. 13C and FIG. 13D in which electromagnetic waves generated from two electrodes each have a different frequency and a different phase. For instance, an alternating current component voltage applied to two electrodes may be adjusted to control the peak-to-peak voltage of an electromagnetic wave, or a direct current component voltage applied to two electrodes may be adjusted to apply the direct current component voltage as an offset voltage in addition to an alternating current component voltage, or different direct current component voltages may be applied to two electrodes, or alternating current component voltages applied to two electrodes may have different peak-to-peak voltage values, different frequencies, and different phases.

Figure 14:
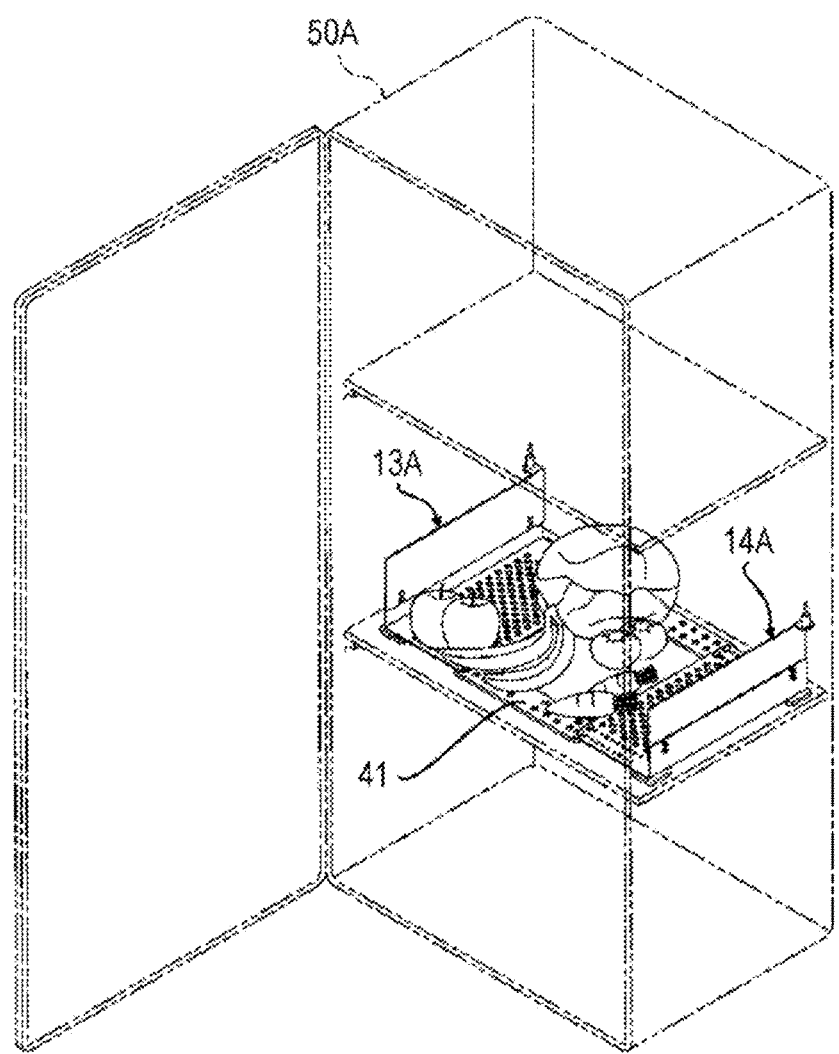
FIG. 14 A diagram of installing electrodes in a refrigerator in at least one embodiment of this disclosure.
Figure 15:
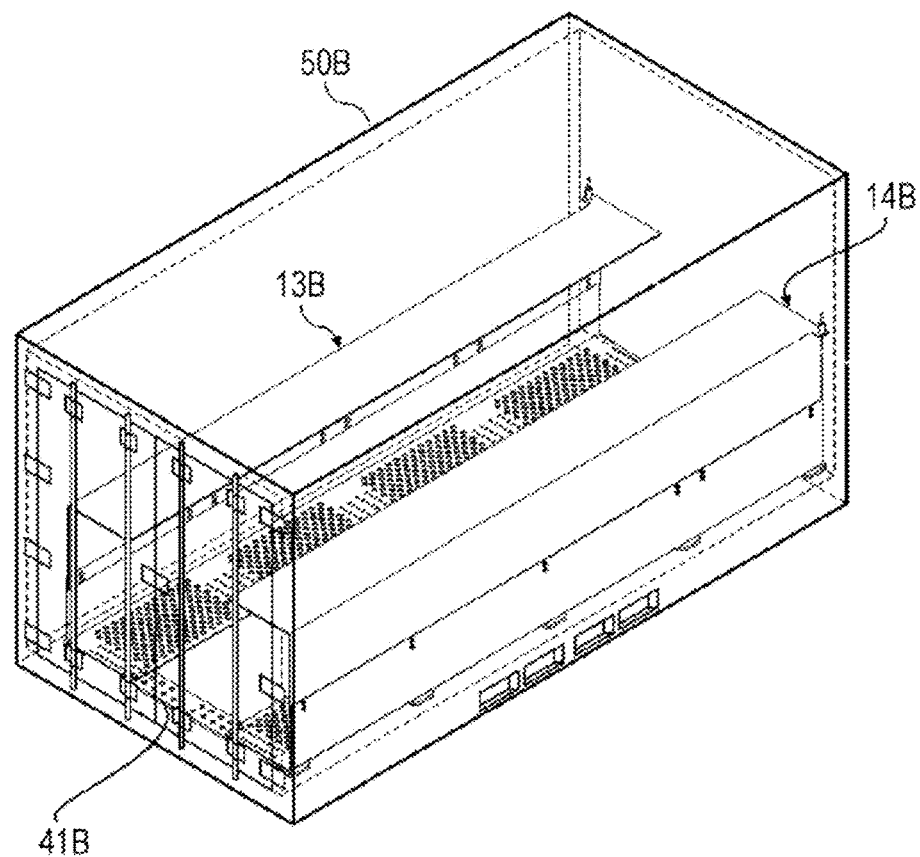
FIG. 15 A diagram of installing the electrodes in a container in at least one embodiment of this disclosure.
Figure 16:
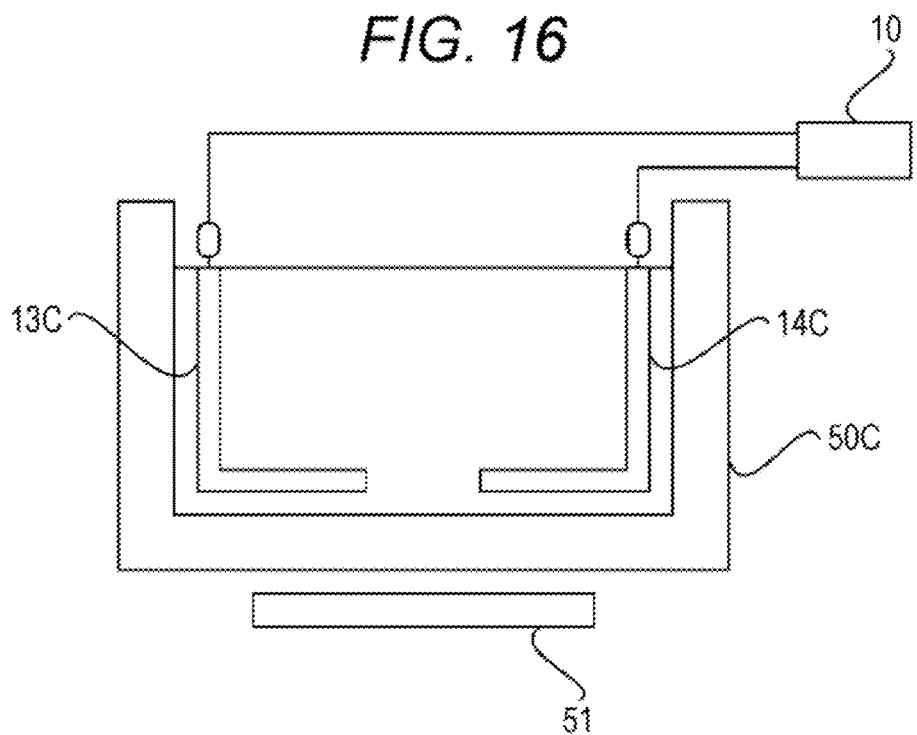
FIG. 16 A diagram of installing the electrodes in a fryer in at least one embodiment of this disclosure.

A moisture control apparatus, a moisture control method, a program, a storage medium, a generated substance, a product, an apparatus, and an equipment according to at least one embodiment of this disclosure are described with reference to FIG. 14 to FIG. 16. FIG. 14 is a diagram of installing electrodes 13A and 14A in a refrigerator. FIG. 15 is a diagram of installing electrodes 13B and 14B in a container. FIG. 16 is a diagram of installing electrodes 13C and 14C in a fryer. The same components as those in FIG. 1 to FIG. 13 are denoted by the same reference symbols, and descriptions of the components are omitted. FIGS. 14-16 give specific examples of the arrangement of the electrodes 13 and 14, and any of the above described arrangements of the electrodes 13 and 14 in the moisture control apparatus according to at least one embodiment is considered.

The electrodes 13A and 14A in FIG. 14 are installed in a refrigerator. The electrodes 13A and 14A installed in the refrigerator, which serves as a housing 50A, are constructed from conductive (e.g., copper, iron, stainless steel, or aluminum) plate-shaped members having a rough L shape in section. While there is no particular limitation on the electrodes 13A and 14A, a plurality of holes (for example, hexagonal or other polygonal holes or circular holes) are formed in a bottom plate. The electrodes 13A and 14A are joined to each other by junctions 41. The junctions 41 are substantially rectangular thin plates made from an insulating material, for example, polytetrafluoroethylene (e.g., Teflon®) or similar fluorocarbon resin. The definition of refrigerator as the housing 50A encompasses home-use refrigerators, business-use large-sized refrigerators, and various other modes of refrigerators.

The electrode shape is not limited to the rough L shape, and may be a flat board shape or a thin film shape. The electrodes 13A and 14A in this case may be installed so as to be opposed to each other on inner walls of the refrigerator serving as the housing 50A. The electrodes 13A and 14A may instead be installed so as to be opposed to each other on the refrigerator's inner ceiling surface, inner bottom surface, or shelves. Alternatively, the electrodes 13A and 14A may be provided so as to be opposed to each other on a door-side inner surface and an inner surface at the back. The least number of electrodes required is 1 and, for example, two electrodes, four electrodes, or six electrodes may be used.

When an electromagnetic field is applied to food in the refrigerator serving as the housing 50A from the electrodes 13A and 14A installed in the refrigerator, water particles as moisture contained in the food in the form of free water or other forms attract one another to form a pearl chain formation. Water molecules aligned in a regular pattern as this do not bond with other components while being held within a substance, and are therefore capable of keeping the food fresh and succulent.

The electrodes 13B and 14B in FIG. 15 are installed in a container. The electrodes installed in the container, which serves as a housing 50B, are constructed from conductive (e.g., copper, iron, stainless steel, or aluminum), plate-shaped members having a rough L shape in section, or a rough C shape in section. While there is no particular limitation on the electrodes 13B and 14B, a plurality of holes (for example, hexagonal or other polygonal holes or circular holes) are formed in a bottom plate. The electrodes 13B and 14B are joined to each other by junctions 41B if required. The junctions 41B are substantially rectangular thin plates made from an insulating material, for example, polytetrafluoroethylene (e.g., Teflon®) or similar fluorocarbon resin. While the container illustrated in FIG. 15 is relatively large in size, the definition of container as the housing 50B encompasses small-sized portable containers, large-sized cargo containers, and various other modes of containers.

The electrode shape is not limited to the rough L shape, and may be a flat board shape or a thin film shape. The electrodes 13B and 14B in this case may be installed so as to be opposed to each other on inner walls of the container serving as the housing 50B. The electrodes 13B and 14B may instead be installed so as to be opposed to each other on the container's inner ceiling surface and inner bottom surface. Alternatively, the electrodes 13B and 14B may be provided so as to be opposed to each other on a door-side inner surface and an inner surface at the back. The least number of electrodes required is 1 and, for example, two electrodes, four electrodes, or six electrodes may be used.

When an electromagnetic field is applied to food in the container serving as the housing 50B from the electrodes 13B and 14B installed in the container, water particles as moisture contained in the food in the form of free water or other forms attract one another to form a pearl chain formation. Water molecules aligned in a regular pattern as this do not bond with other components while being held within a substance, and are therefore capable of keeping the food fresh and succulent. The container in which the electrodes 13B and 14B are installed may be placed in a refrigerated warehouse, a freezer warehouse, a freshness maintaining warehouse, or the like to be managed in a desired preservation temperature zone, but is capable of keeping food fresh even when placed in a warehouse that does not have a special freshness maintaining function.

The electrodes 13C and 14C in FIG. 16 are installed in a fryer (a housing 50C). The electrodes 13C and 14C installed in the fryer, which serves as the housing 50C, are constructed from conductive (e.g., copper, iron, stainless steel, or aluminum), plate-shaped members having a rough L shape in section. While there is no particular limitation on the electrodes 13C and 14C, a plurality of holes (for example, hexagonal or other polygonal holes or circular holes) are formed in a bottom plate. The electrodes 13C and 14C are installed so that bottom surfaces of the electrodes 13C and 14C lie along the inner bottom surface of an oil tub of the fryer. A heating unit 51 is provided outside the oil tub of the fryer, in the example of FIG. 16, outside the bottom surface of the oil tub. The electrodes 13C and 14C are electrically connected to the controller 10, and an output voltage of the controller 10 is applied to the electrodes 13C and 14C.

When an electromagnetic field is applied to the interior of the oil tub of the fryer from the electrodes 13C and 14C, the interfacial tension at the oil-water boundary is lowered, and the applied electromagnetic field also causes water particles of free water contained in food to form a pearl chain formation, thereby hindering the escape of moisture from the food. An effect of reducing the permeation of oil into food is thus obtained by preventing sudden boil-up through the control of moisture contained in the food. Because of the effect, the cooked food acquires truly excellent texture and flavor.

This disclosure is not limited to the examples of the fourth embodiment in which a voltage and/or a current is constantly applied to the two electrodes 13 and 14. Instead of constantly applying a voltage and/or a current to the two electrodes 13 and 14 inside the housing 50 in which a substance is placed, a voltage and/or a current may be applied only at given timing or only for a given length of time. For example, food in a refrigerator serving as the housing 50A can always be kept fresh with the use of an electromagnetic field application pattern in which an electromagnetic field is applied to the food in the refrigerator by the electrodes 13A and 14A for an hour, no voltage or current is applied to the electrodes 13A and 14A for the subsequent 47 hours, and then an electromagnetic field is applied to the food in the refrigerator for an hour again. Power consumption is consequently reduced. This is considered to be because approximately one hour of electromagnetic field application by the electrodes 13A and 14A to food in the refrigerator causes water particles as moisture contained in the food in the form of free water or other forms to attract one another and form a pearl chain formation, and the pearl chain formation of water molecules is maintained for a given length of time after that even in the absence of an electromagnetic field. Lengths of time suitable for the type or state of food in the refrigerator, the preservation temperature/humidity, and other factors are set to the time period in which an electromagnetic field is applied by the electrodes 13A and 14A to the food in the refrigerator and to the subsequent time period in which no voltage or current is applied to the electrodes 13A and 14A. It is recommended to time the period in which an electromagnetic field is applied to food newly put in the refrigerator with the entrance of the food to the refrigerator. The entrance of new food to the refrigerator can be detected by, for example, a camera in the interior of the refrigerator or the opening and closing of the refrigerator's door.

In another example in which a container serves as the housing 50B, too, approximately one hour of electromagnetic field application by the electrodes 13B and 14B to food in the container causes water particles as moisture contained in the food in the form of free water or other forms to attract one another and form a pearl chain formation and, once water molecules form a pearl chain formation, this state is maintained for a given length of time even in the absence of an electromagnetic field. Freshness can accordingly be maintained at reduced power consumption by providing a given length of period in which no electromagnetic field is applied after the period in which an electromagnetic field has been applied by the electrodes 13B and 14B to the food in the container, and then providing a period in which an electromagnetic field is applied. When the power source used is a battery, in particular, the reduction in power consumption prolongs the freshness maintaining period per charge. The period in which an electromagnetic field is applied is not limited to an hour, and the period in which no electromagnetic field is applied, too, can be set to a suitable length of time. The application period and the no-application period can be adjusted to suit the type and state of a substance in the container, a temperature and a humidity at which the container is stored, and other factors. It is recommended to time the period in which an electromagnetic field is applied to a substance newly put in the container with the entrance of the substance to the container. The entrance of a new substance to the container can be detected by, for example, a camera in the interior of the container, a signal from the man-machine interface 31, or information in management database of a warehouse in which the container is housed.

In another example in which a fryer serves as the housing 50C, too, there is no need to constantly apply an electromagnetic field from the electrodes 13C and 14C to the interior of the fryer's oil tab, and electromagnetic field application can be scheduled so that a period in which an electromagnetic field is applied by the electrodes 13C and 14C to the interior of the oil tab is followed by a given length of period in which no electromagnetic field is applied, and then by a period in which an electromagnetic field is applied. In this case also, the moisture control apparatus can sustain the effect of reducing the permeation of oil into food by preventing sudden boil-up through the control of moisture contained in the food, and the resultant effect of giving the cooked food truly excellent texture and flavor. Suitable lengths of time can be determined for the period in which an electromagnetic field is applied to the interior of the fryer's oil tab and the period in which no electromagnetic field is applied, based on what food is cooked, the type of oil, the temperature of oil, and other factors.

Figure 17:
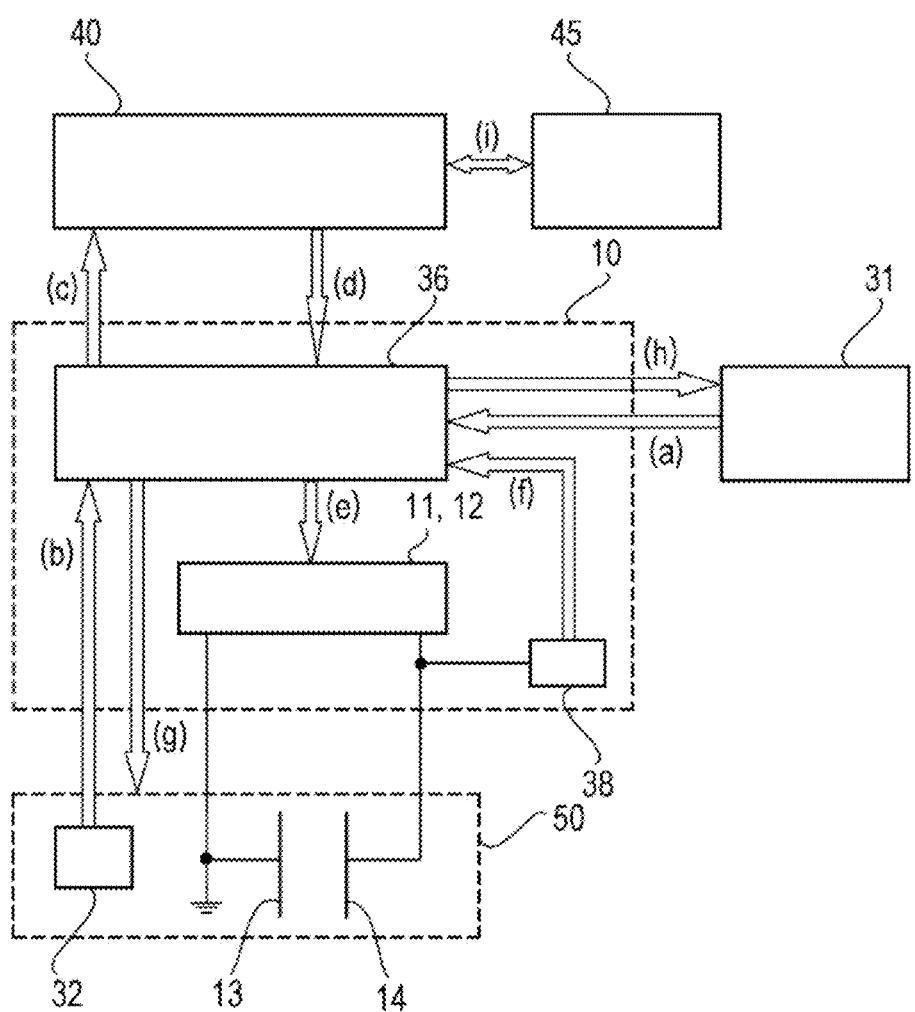
FIG. 17 A block diagram of a moisture control apparatus according to at least one embodiment of this disclosure.

A moisture control apparatus, a moisture control method, a program, a storage medium, a generated substance, a product, an apparatus, and an equipment according to at least one embodiment of this disclosure are described with reference to FIG. 17. FIG. 17 is a block diagram of the moisture control apparatus 1. The same components as those in FIG. 1 to FIG. 16 are denoted by the same reference symbols, and descriptions of the components are omitted.

FIG. 17 is a block diagram corresponding to FIG. 1. The communicator 35, the storage 37, and the external power source 39, among others, however, are omitted from FIG. 17. More specifically, while the CPU 36 actually holds communication to and from a server and the like via the communicator 35, receives data input from and outputs data to the storage 37, and receives a supply of electric power from the external power source 39, those operations are omitted in FIG. 17. The controller 10, which is situated outside the housing 50 in FIG. 17, is not limited thereto and may be provided, for example, inside the housing 50.

Flows (a) to (h) in FIG. 17 are described in order. In the flow (a), settings of the controller 10 are input from the man-machine interface 31. The settings of the controller 10 are, for example, settings about the turning on/off of the controller 10, the operation mode, the type and state of a substance, and output voltages and/or output currents of the alternating current component voltage generator 11 and the direct current component voltage generator 12. Examples of the operation mode include an automatic mode, a substance input mode, and a manual setting mode. In the automatic mode, for example, the controller 10 is controlled automatically so that a substance reaches an appropriate state, based on a detection signal from the substance detection sensor 32, a detection signal from the detector 38, and a control parameter and a control value from the server 40 as described later. In the substance input mode, for example, the controller is controlled in a manner suitable for a substance by inputting the type and state of the substance from the man-machine interface 31. In the manual setting mode, for example, the output voltages and/or output currents of the alternating current component voltage generator 11 and the direct current component voltage generator 12 are set manually. The following description takes the case of the automatic mode as an example, unless otherwise noted. In the flow (a), a set value about the housing 50 may also be input from the man-machine interface 31 to the housing 50 when the housing 50 has an automatic adjustment function.

In the flow (b), information about a substance is collected from the substance detection sensor 32 by command from the CPU 36. When the housing 50 is a refrigerator, for example, information collected by the substance detection sensor 32 about a substance includes, among others, an image captured by a camera in the interior of the refrigerator, a detection signal about moisture in food from a moisture amount sensor, and detection signals from a temperature sensor and a humidity sensor (including a detection signal from a sensor built into the refrigerator). When the housing 50 is a container, for example, information collected by the substance detection sensor 32 about a substance includes, among others, an image captured by a camera in the interior of the container, detection signals from a temperature sensor and a humidity sensor in the interior of the container, and a signal from a GPS provided in the container (a GPS may be provided in the controller 10). When the housing 50 is a fryer, for example, information collected by the substance detection sensor 32 about a substance includes, among others, an image of a camera capturing food that is being cooked, a detection signal about moisture in the food from a moisture amount sensor, a temperature detection signal of the food, a temperature detection signal of the oil in the fryer, information about the type of the oil in the fryer, and information about when to change the oil in the fryer.

In the flow (c), the information collected from the substance detection sensor 32 about a substance by command from the CPU 36 is transmitted to the server 40 via the communicator 35. When the settings in the flow (a) specify the substance input mode, information transmitted to the server 40 is, for example, information about the type and state of a substance that is input from the man-machine interface 31.

When the settings in the flow (a) specify the manual setting mode, information about, for example, output voltages and/or output currents of the alternating current component voltage generator 11 and the direct current component voltage generator 12 may be transmitted to the server 40, from which a given control parameter and a control value are transmitted to the CPU 36 after a given correction is made to the control parameter and the control value by the server 40. In another example, manually set output voltages and/or output currents of the alternating current component voltage generator 11 and the direct current component voltage generator 12 may be transmitted to the server 40 for information collection by the server 40, while a control value is calculated by the CPU 36. When the control value correction and information collection described above are not required to be conducted on the server 40, for example, transmission of information about the output voltages and/or output currents to the server 40 is not required in the flow (c).

A control parameter and control value suitable for the type and state of a substance are calculated on the server 40. When calculating the control parameter and the control value, the server 40 can also refer to information other than the type and state of a substance, for example, the season, the weather, a weather forecast, the date/time, the location, a supply and demand projection, the stocking/retrieval situation and storage situation of a refrigerator, a container's transportation route and the traffic situation on the route, the situation of a group of containers related to the container of interest, inventory management information, the crowd situation at a shop, an economic index, and information on the Web, through communication to/from an external server and a database 45.

Of the pieces of information collected by the substance detection sensor 32 about a substance, an image captured by the camera can be used to identify the type and state of the substance by image recognition on the server 40. In the image recognition, the type and state of the substance can be recognized accurately with the use of AI that employs deep learning, for example. Specifically, the type and state of the substance can be recognized accurately from an image captured by a camera by using an image of food shot with a camera and a neural network trained with data about the actual type and state of the food. The server can accumulate a large number of pieces of image recognition data through communication to/from other controllers 10, thereby enhancing the precision of image recognition even more with respect to a diversity of substances. When the controller 10 includes an AI program, the CPU 36 may conduct image recognition to transmit the result of the image recognition to the server 40 in the flow (c). The communication amount of data transmission in the flow (c) can be reduced when image recognition is conducted in the controller 10 in this manner.

In the flow (d), the control parameter and control value calculated on the server 40 are transmitted to the CPU 36 of the controller 10.

In the flow (e), the CPU 36 uses the control parameter and control value transmitted from the server 40 to control output voltages and/or output currents of the alternating current component voltage generator 11 and the direct current component voltage generator 12.

In the flow (f), the CPU 36 performs feedback control on at least one of the current value, voltage value, frequency, or phase of a voltage/current applied to the electrodes 13 and 14, based on a detection signal detected by the detector 38. The detection signal detected by the detector 38 includes at least one of the voltage applied to the electrodes, the current applied to the electrodes, the frequency and/or phase of the voltage and/or current applied to the electrodes, a magnetic field between the electrodes 13 and 14, an electric field between the electrodes 13 and 14, or a sonic wave and/or a supersonic wave between the electrodes 13 and 14. The control value fed back in the feedback control may be a control value calculated in the CPU 36, or may be a control value calculated on the server 40.

When the control value fed back is a control value calculated in the CPU 36, a control target value has been transmitted in the flow (d) from the server 40 to the CPU 36. Alternatively, a set value as a control target value is input in the flow (a) in the case of the manual mode. A control target value can be set so as to be variable with time, based on information collected by the substance detection sensor 32 about a substance. When the control value fed back is a control value calculated on the server 40, a detection signal detected by the detector 38 is transmitted to the server 40 in the flow (c) in order to calculate the control value to be fed back on the server 40, the server 40 calculates the control value to be fed back, and the control value is transmitted from the server 40 to the CPU 36 in the flow (d).

While the detector 38 is used in the example described in the fifth embodiment, control can be performed without using the detector 38. In this case, the flow (f) is omitted and output voltages and/or output currents of the alternating current component voltage generator 11 and the direct current component voltage generator 12 are controlled in the flow (e). Sensor-less control, open-loop control, and other various types of control can be adopted for this control.

In the flow (g), a control command from the CPU 36 may be transmitted to the housing 50 when the housing 50 has an automatic adjustment function. When the housing 50 is a refrigerator, the control command is, for example, a set value about the temperature or the humidity in the interior of the refrigerator. When the housing 50 is a container that has a function of adjusting the temperature and the humidity, the control command is, for example, a temperature/humidity setting value issued to the container. When the housing 50 is a container that is stored in a warehouse capable of adjusting the temperature and the humidity, information about an adjustment of the temperature and humidity of this container is transmitted in the flow (i), as described later, to the warehouse's management server, which corresponds to an external server and the database 45, to be used to appropriately adjust the temperature/humidity state of all containers including other containers. When the housing 50 is a fryer, the control command is, for example, a set value for setting the temperature of oil in an oil tub, and may inform of the time to change oil if required. When the housing 50 does not have an automatic adjustment function, the flow (g) is not an indispensable component and, in this case, information about the control command from the CPU 36 is displayed on the man-machine interface 31, for example, in the flow (h), which is described later.

In the flow (h), the man-machine interface 31 displays the situation of control in the CPU 36, for example, the control situation of output voltages and/or output currents of the alternating current component voltage generator 11 and the direct current component voltage generator 12, information about the type and state of the currently handled substance, and the situation of the housing 50 (detection information of the substance detection sensor 32). The control situation displayed when the housing 50 does not have an automatic adjustment function is information about a control command issued to the housing 50 from the CPU 36. In addition to those pieces of information, information sent from the server 40 in the flow (d) along with a control parameter and a control value can be displayed on the man-machine interface 31 when required, or, in response to operation performed on the man-machine interface 31. Examples of the additionally displayed information include the season, the weather, a weather forecast, the date/time, the location, a supply and demand projection, the stocking/retrieval situation and storage situation of a refrigerator, a container's transportation route and the traffic situation on the route, the situation of a group of containers related to the container of interest, inventory management information, the crowd situation at a shop, an economic index, and information on the Web. An operator can produce or manage a substance properly by taking the displayed information into consideration.

The man-machine interface 31 can be configured unitarily with the controller 10. The man-machine interface 31 can also be a separate member from the controller 10, or a separate member that has some of functions of the controller 10. The man-machine interface 31 in this case can be configured as a portable terminal having a communication function, for example, a smartphone, a cellular phone, a tablet terminal, or a PC. When the man-machine interface 31 is a separate member that has some of functions of the controller 10, at least one of, or some of, the function of the communicator 35, the function of the storage 37, or the arithmetic function of the CPU 36 out of the functions of the controller 10 can be included in the separate man-machine interface 31. The function of the substance detection sensor 32 and the function of the detector 38, or some of the functions, can also be integrated into the man-machine interface 31. For instance, a camera function built into a smartphone, a cellular phone, a tablet terminal, or a PC can be utilized as the substance detection sensor 32.

In the flow (i), the server 40 transmits/receives information required for the management of a substance and collects data through communication to and from an external server and the database 45. The server 40 can hold communication to and from an external server over the Internet. The server 40 can accordingly access, when the housing 50 is a container, a management database and management server of a warehouse in which the container is managed.

Effects of at least one embodiment are described by using, as a configuration example in which the housing 50 is a refrigerator, an example in which a tablet terminal serves as the man-machine interface 31, and the refrigerator includes a camera in the interior of the refrigerator, a temperature sensor, a humidity sensor, and an automatic temperature/humidity adjustment function. The effects of the at least one embodiment are applicable to other device besides a refrigerator. In the example described here, the tablet terminal is operated to select the "automatic mode" as the operation mode and "low" as the refrigeration temperature, and the selections are transmitted to the CPU in the flow (a).

A refrigerator interior area that includes at least food preserved between two electrodes is photographed by the camera in the refrigerator serving as the substance detection sensor 32, and the photograph is transmitted as information to the server 40 in the flow (b) and the flow (c). The server 40 identifies the type and state of the food that is a processing object by image recognition with the use of AI, for example. The refrigerator interior area photographed by the camera desirably captures the entirety of the preserved food, and a plurality of cameras may be arranged in at least one embodiment. Information detected by the temperature sensor and the humidity sensor in the interior of the refrigerator as the substance detection sensor 32 is also transmitted to the server 40 in the flow (b) and the flow (c). The server 40 uses the food type and state identified by image recognition and the transmitted information about the temperature and the humidity in the refrigerator to calculate a control parameter and control value related to output voltages and/or output currents of the alternating current component voltage generator 11 and the direct current component voltage generator 12, while taking into consideration an electromagnetic field to be generated from the electrodes 13 and 14. The control parameter and the control value vary depending on the type and state of food preserved. For instance, the control parameter and the control value differ when a leaf vegetable is preserved, when raw sea bream is preserved, and when sea bream already cooked by simmering is preserved.

In the flow (d), the control parameter and the control value are transmitted to the CPU 36, and output voltages and/or output currents of the alternating current component voltage generator 11 and the direct current component voltage generator 12 are controlled appropriately based on the control parameter and the control value. In the flow (f), feedback control is performed on output voltages and/or output currents of the alternating current component voltage generator 11 and the direct current component voltage generator 12, based on a detection value of the detector 38. In the flow (g), the temperature and the humidity in the refrigerator are controlled appropriately based on the information in the flow (a) (refrigeration temperature: "low"), the information calculated by the server 40, and the like.

In the flow (h), various types of information about the preserved food can be displayed on the tablet terminal along with the information sent from the server 40. At least one out of the type, state, stocking date, and expiration date of the preserved food, a notice about food approaching an expiration date, a menu of dishes that use the preserved food, cooking methods, and a shopping list can be given as an example of the information that can be displayed on the tablet terminal. The flow (i) includes the obtainment of data required for the calculation on the server 40. The information obtained by the server can also be obtained with the use of the communication function of the tablet terminal. The communication amount can accordingly be reduced in the flow (d) and the flow (h) when the URL or the like instead of the information is transmitted in the flow (d) and flow (h).

Next, effects of at least one embodiment are described by using, as a configuration example in which the housing 50 is a container, an example in which a tablet terminal serves as the man-machine interface 31, the container includes a GPS, and a warehouse in which the container is housed includes a management database and a management server. In the example described here, the tablet terminal is operated to select the "automatic mode" as the operation mode, and information "apples harvested on Month Y, Day Z in Year X (immediately after harvest)" is transmitted as the type and state of the substance to the CPU in the flow (a).

The GPS as the substance detection sensor 32 transmits location information of the container to the server 40 in the flow (b) and the flow (c), along with the information about the type and state of the substance. The server 40 thus knows the location of the container and stores, for example, a record of the transportation by land of the container in which "apples harvested on Month Y, Day Z in Year X" are loaded, and of the warehousing of the container in a given warehouse. The server 40 can access the management database of the relevant warehouse (the flow (i) described above) as well via an Internet connection, and can accordingly keep track of data about the container management situation in the warehouse.

The server 40 uses pieces of information including the container location information, the type and state of the substance, and information obtained in the flow (i), for example, the state of the interior of the warehouse, the location, the season, the weather, a weather forecast, and the situation of a group of containers related to the container of interest, to calculate a control parameter and control value related to output voltages and/or output currents of the alternating current component voltage generator 11 and the direct current component voltage generator 12, while taking into consideration an electromagnetic field to be generated from the electrodes 13 and 14. In this manner, the server 40 can calculate a control parameter and control value suitable for the case in which "apples harvested on Month Y, Day Z in Year X" are stored in a given warehouse.

In the flow (d), the control parameter and the control value are transmitted to the CPU 36, and output voltages and/or output currents of the alternating current component voltage generator 11 and the direct current component voltage generator 12 are controlled appropriately based on the control parameter and the control value. In the flow (f), feedback control is performed on output voltages and/or output currents of the alternating current component voltage generator 11 and the direct current component voltage generator 12, based on a detection value of the detector 38. The flow (g) is omitted here because the container does not have a temperature control function or a similar function in the described example.

In the flow (h), various types of information about the substance loaded in the container can be displayed on the tablet terminal along with the information sent from the server 40. At least one out of the type and state of the food loaded in the container, the route and history of transportation, a future distribution plan, the warehouse in which the substance is currently stored, the management situation in the warehouse, the peak ripeness time, the expiration date, and information about another related container can be given as an example of the information that can be displayed on the tablet terminal. In the flow (i), information for the management of the container of interest is sent from the server 40 directly to the management server that handles the management database of the warehouse in which the container is stored, to be used for the management of the warehouse.

Next, effects of at least one embodiment are described by using, as a configuration example in which the housing 50 is a fryer, an example in which a tablet terminal serves as the man-machine interface 31, a camera on the tablet terminal is used in place of a camera of the substance detection sensor, and the fryer has an automatic adjustment function for adjusting the temperature of oil in the fryer. In the example described here, the tablet terminal is operated to select the "automatic mode" as the operation mode and "automatic" as the oil temperature, and the selections are transmitted to the CPU in the flow (a).

A camera on the tablet terminal is used to photograph food to be cooked in the fryer, in place of a camera of the substance detection sensor 32. The photograph is transmitted as information to the server 40 in the flow (c). Instead of a camera on the tablet terminal, a camera mounted on the fryer as the substance detection sensor 32 may also be used. Food to be cooked needs to be photographed only at the beginning of cooking, after the food to be cooked is changed from the previously cooked food. Information about the oil temperature from the fryer as the substance detection sensor 32 is transmitted to the server 40 as well in the flow (b) and the flow (c). In at least one embodiment, a sensor for measuring the moisture amount of food, a sensor for measuring the temperature of food, and other sensors may be provided to transmit information of those sensors to the server 40 in the flow (b) and the flow (c).

The server 40 determines the type and state of food that is a processing object by image recognition with the use of AI, for example. The server 40 uses the food type and state identified by image recognition, various types of information transmitted in the flow (c), and information obtained in the flow (i), for example, the season, the weather, a weather forecast, the date/time, the location, and the crowd situation at a shop, to set the oil temperature of the fryer, and to calculate a control parameter and control value related to output voltages and/or output currents of the alternating current component voltage generator 11 and the direct current component voltage generator 12, while taking into consideration an electromagnetic field to be generated from the electrodes 13 and 14. The control parameter and the control value as well as the temperature of oil in the fryer vary depending on the type and state of food to be cooked and other factors. For instance, the control parameter, the control value, and the oil temperature differ when cooking fried potatoes and when cooking fried chicken.

In the flow (d), the control parameter and the control value are transmitted to the CPU 36, and output voltages and/or output currents of the alternating current component voltage generator 11 and the direct current component voltage generator 12 are controlled appropriately based on the control parameter and the control value. In the flow (f), feedback control is performed on output voltages and/or output currents of the alternating current component voltage generator 11 and the direct current component voltage generator 12, based on a detection value of the detector 38. In the flow (g), the temperature of oil in the fryer are controlled appropriately based on the information calculated by the server 40.

In the flow (h), various types of information about the food to be cooked can be displayed on the tablet terminal along with the information sent from the server 40. At least one out of the type and state of food to be cooked, the temperature of oil in the fryer, the number of pieces of food to be cooked, the history of cooked foods, and food planned to be cooked next can be given as an example of information that can be displayed on the tablet terminal. The flow (i) includes the obtainment of data required for the calculation on the server 40. The information obtained by the server can also be obtained with the use of the communication function of the tablet terminal. The communication amount can accordingly be reduced in the flow (d) and the flow (h) when the URL or the like instead of the information is transmitted in the flow (d) and flow (h).

This application is based on Japanese Patent Application No. 2017-100354 filed on May 19, 2017, Japanese Patent Application No. 2017-126102 filed on Jun. 28, 2017, Japanese Patent Application No. 2017-151155 filed on Aug. 3, 2017, and Japanese Patent Application No. 2017-153591 filed on Aug. 8, 2017, the contents of which are incorporated herein by reference in their entirety, including the specification, the scope of claims, and drawings.

The invention claimed is:

1. A control apparatus, comprising:
   at least one electrode configured to receive a predetermined voltage including a direct current component or an alternating current component, and to direct an electromagnetic field toward a substance;
   a server configured to set a control parameter suitable for a type or a state of the substance; and
   a controller configured to:
      control an interfacial polarization or interfacial tension between a moisture phase and another phase in the substance, and formation of pearl chain of the moisture in the substance, by controlling the voltage or current applied to the at least one electrode based on the control parameter,
   wherein
   (1) the at least one electrode is located along a side wall surface, ceiling surface, shelf, bottom surface, door side inner surface, or back side of a refrigerator,
   (2) the type or state of the substance is received by the controller based on input information from a man-machine interface or detection information from a substance detection sensor including at least one of the following information: an image from a camera inside the refrigerator, a detection signal related to the moisture of the substance by a moisture content sensor, a detection signal from a temperature sensor inside the refrigerator, a detection signal from a humidity sensor inside the refrigerator, or a detection signal from a sensor built in the refrigerator, (3) before the voltage or current is applied to the at least one electrode, the server sets the control parameter suitable for the type or the state of the substance based on a relationship between the electromagnetic field and the degree of increase in interfacial polarization or the degree of decrease in interfacial tension, with further reference to the refrigerator's incoming/outgoing, storage status, or inventory control information, (4) the server is configured to select a voltage value of the voltage applied from a range of 0 to 2,000 Vpp/cm and by selecting a frequency of the alternating current component of the voltage from a range of 0 Hz to 1 MHz according to the control parameter suitable for the type or the state of the substance, and (5) the controller is configured to cause the at least one electrode to output signal representing the selected voltage value or the frequency to the at least one electrode to control the interfacial polarization or interfacial tension according to the electromagnetic field generated by the electrode.

2. The control apparatus according to claim 1, wherein the controller is configured to control the at least one electrode for causing formation of pearl chain, a directional formation of water bonded state, a moisture bonded state, or a moisture activity of the moisture in the substance.

3. The control apparatus according to claim 1, wherein the controller is configured to control the at least one electrode for controlling an interfacial polarization, an interfacial tension, or an emulsion state between a moisture phase and another phase of the substance.

4. The control apparatus according to claim 1, wherein the controller is configured to control the at least one electrode for controlling a state of a reactive oxygen species in the substance or a conductivity of the substance.

5. The control apparatus according to claim 1, wherein the controller is configured to control a temperature or a humidity of an atmosphere around the substance.

6. The control apparatus according to claim 1, wherein the at least one electrode comprises a pair of electrodes, and each electrode of the pair of electrodes is configured to direct at least one of an electric field, a magnetic field, an electromagnetic field, an electromagnetic wave, a sonic wave, or an ultrasonic wave toward the substance for a predetermined amount, so that an effect of improving properties of the substance is maintained for a predetermined length of time after the substance placed between the pair of electrodes is removed from between the pair of electrodes.

7. The control apparatus according to claim 1, wherein the controller is configured to control the at least one electrode for inducing an electric potential in an aggregation of water molecules in the bonded state to be the same.

8. The control apparatus according to claim 1, wherein the at least one electrode is configured to receive both the alternating current and the direct current.

9. The control apparatus according to claim 1, wherein the at least one electrode comprises a plurality of electrodes, and the controller is configured to control the plurality of electrodes such that at least one of a voltage value, a frequency or a phase applied to a first electrode of the plurality of electrodes is different from that of a second electrode of the plurality of electrodes.

10. The control apparatus according to claim 1, wherein the controller is further configured to control the at least one electrode to receive the direct current having a voltage value equal to or less than 100 volts(V).

11. The control apparatus according to claim 1, wherein the substance includes at least one of a solid, a liquid, a gas, and combinations thereof.

12. The control apparatus according to claim 1, wherein the controller is configured to control the at least one electrode for lowering interfacial tension in the substance by at least 60%.

13. The control apparatus according to claim 1, wherein the controller configured to perform feedback control on at least one of a voltage, a current, a frequency, or a phase that is received by the at least one electrode.

14. The control apparatus according to claim 1, wherein the control parameter includes a control target voltage, control target current, control target frequency, or control target phase received by the at least one electrode based on a type or a state of the substance.

15. The control apparatus according to claim 1, wherein the controller is configured to receive information from an external source.

16. The control apparatus according to claim 1, wherein the controller comprises at least one of:
a direct current-direct current converter;
a direct current-alternating current converter;
an alternating current-direct current converter; or
an alternating current-alternating current converter.

17. The control apparatus according to claim 1, further comprising a battery configured to supply power to the controller.

18. The control apparatus according to claim 1, further comprising a sensor configured to communicate with the controller, wherein the sensor configured to detect at least one of substance type, substance state, electric field state, magnetic field state, electromagnetic field state, electromagnetic wave state, sonic wave state, ultrasonic wave state, electric current state, or voltage state.

19. The control apparatus according to claim 1, wherein the at least one electrode is a plate electrode, a rod electrode, a spherical electrode, a hemispherical electrode, an L-shaped electrode, a foil electrode, a film electrode or a flake electrode.

20. The control apparatus according to claim 1, wherein the at least one electrode comprises:
a first electrode comprising a first material; and
a second electrode comprising a second material.

21. The control apparatus according to claim 20, wherein the first material is the same as the second material.

22. The control apparatus according to claim 20, wherein the first material is different from the second material.

23. The control apparatus according to claim 1, wherein the moisture control apparatus is detachably mounted to an existing equipment.

24. The control apparatus according to claim 1, wherein the moisture control apparatus is mobile, conveyable or portable.

25. A control apparatus according to claim 1, comprising two or more electrodes,
wherein the moisture control apparatus is configured to set, for each of the two or more electrodes, at least one of a voltage, a current, a frequency, or a phase that is applied to the electrode.

26. The control apparatus according to claim 1, wherein fine bubbles are added to the substance.

27. The control apparatus according to claim 1, wherein the moisture control apparatus is applied to at least one field out of a manufacturing field, a distribution field, a logistics field, a storage field, a sales field, an industrial field, a construction field, a civil engineering field, a machine field, an electricity field, an electronics field, a communications field, an optics field, a chemistry field, a petroleum chemistry field, an agricultural field, a mercantile field, a fisheries field, a food field, a food service field, a culinary field, a service field, a medical field, a health field, a welfare field, and a nursing care field.

28. The control apparatus according to claim 1, wherein the substance includes at least one selected from the group consisting of:
   (1) one of articles of food including agricultural products, flowers, animal products, aquatic products, processed food, health food, beverages, alcoholic drink, dry foods, stocks, and seasoning,
   (2) one of products including resin, rubber, glass, lenses, pottery, lumber, cement, concrete, paper, ink, dye, fibers, ceramics, polishing agents, washing agents, additives, printed boards, plating, refining materials, paint, Chinese ink, water repellents, chemical products, fertilizer, animal feed, microbes, water, cloth, and explosives,
   (3) fuel including gasoline, light gas oil, heavy fuel oil, kerosene, and petroleum,
   (4) one of medical products including blood, vaccines, drugs, organs, cells, ointments, dialyzers, and medical treatment instruments, and
   (5) one of commodities including beauty products, detergents, soaps, shampoos, and hair care products.

29. The control apparatus according to claim 1, further comprising
   a sensor configured to detect the type or the state of the substance, wherein
   the controller is configured to control the interfacial polarization or interfacial tension in response to an output of the sensor.

30. The control apparatus according to claim 29, wherein the sensor comprises a camera for capturing an image of the substance.

31. The control apparatus according to claim 1, further comprising:
   a storage configured to store the control parameter set before the voltage or current is applied to the at least one electrode.

32. The control apparatus according to claim 31, wherein the storage includes a removable memory.

33. The control apparatus according to claim 31, wherein the control parameter stored in the storage is rewritten in advance.

34. The control apparatus according to claim 31, wherein the control parameter stored in the storage is rewritten from the server via a communicator.

* * * * *